«12» United States Patent
Mao et al.

«10» Patent No.: US 12,526,215 B2
«45» Date of Patent: Jan. 13, 2026

«54» PACKET PROCESSING METHOD AND RELATED DEVICE

«71» Applicant: HUAWEI TECHNOLOGIES CO., LTD., Guangdong (CN)

«72» Inventors: Jianwei Mao, Beijing (CN); Shuping Peng, Beijing (CN)

«73» Assignee: HUAWEI TECHNOLOGIES CO., LTD., Shenzhen (CN)

«*» Notice: Subject to any disclaimer, the term of this patent is extended or adjusted under 35 U.S.C. 154(b) by 373 days.

«21» Appl. No.: 18/142,989

«22» Filed: May 3, 2023

«65» Prior Publication Data

US 2023/0275819 A1 Aug. 31, 2023

Related U.S. Application Data

«63» Continuation of application No. PCT/CN2022/101358, filed on Jun. 27, 2022.

«30» Foreign Application Priority Data

Jun. 25, 2021 (CN) .......................... 202110713692.4

«51» Int. Cl.
H04L 43/08 (2022.01)
H04L 47/2491 (2022.01)
H04L 47/80 (2022.01)

«52» U.S. Cl.
CPC .......... H04L 43/08 (2013.01); H04L 47/2491 (2013.01); H04L 47/805 (2013.01)

«58» Field of Classification Search
CPC .............................. H04L 47/805; H04L 43/08
(Continued)

«56» References Cited

U.S. PATENT DOCUMENTS

2002/0057699 A1 5/2002 Roberts
2015/0124601 A1 5/2015 Li et al.
(Continued)

FOREIGN PATENT DOCUMENTS

CN 110752993 A 2/2020

OTHER PUBLICATIONS

Z. Li et al, Application-aware IPv6 Networking (APN6) Encapsulation draft-li-6man-app-aware-ipv6-network-03, IETF, Aug. 26, 2021, total 14 pages.

(Continued)

Primary Examiner — Sibte H Bukhari
«74» Attorney, Agent, or Firm — WOMBLE BOND DICKINSON (US) LLP

«57» ABSTRACT

Embodiments of this application disclose a packet processing method and a related device. When determining a first network resource based on dynamic information, a network device performs in-band flow measurement in a network domain in which the first network resource is used, to detect actual transmission quality of a packet of an application in the network domain. By comprehensively considering dynamic information, of the application, used when the packet of the application is forwarded by using the first network resource and a detection result of in-band flow measurement in the network domain, the network device obtains a second network resource for forwarding a packet of the application, and forwards a subsequent packet of the application for the application in the network domain by using the second network resource.

19 Claims, 16 Drawing Sheets

(58) Field of Classification Search
USPC .......................................................... 370/352
See application file for complete search history.

(56) References Cited

U.S. PATENT DOCUMENTS

2016/0099857 A1* 4/2016 Begwani ................. H04L 43/20
                                                           370/252
2018/0191619 A1* 7/2018 Karthikeyan ........... H04L 47/76

OTHER PUBLICATIONS

Zhenbin Li et al: Application-aware Networking (APN) Framework draft-li-apn-framework-02, IETF, Aug. 26, 2021, total 11 pages.
H. Song et al: In-situ Flow Information Telemetry draft-song-opsawg-ifit-framework-13, IETF, Apr. 8, 2021, total 28 pages.
Xiang Peng et al: A QoE-Based Alarm Model for Terminal Video Quality, 2019 IEEE Global Conference on Signal and Information Processing (GlobalSIP), Nov. 11-14, 2019, total 5 pages.
Sara Vlahovic et al: Challenges in Assessing Network Latency Impact on QoE and In-Game Performance in VR First Person Shooter Games, 2019 15th International Conference on Telecommunications (ConTEL), Jul. 3-5, 2019, total 8 pages.

* cited by examiner

Application-aware ID option Application-aware ID Option field:

| | Option type Option Type field | Option length Option Length field |
|---|---|---|
| Option value Option Value field | | |

FIG. 1

Option value Option Value field in an application-aware ID option Application-aware ID Option field:

| Service level agreement SLA level | Application identifier APP ID | User identifier User ID | Flow identifier Flow ID of an application |
|---|---|---|---|

FIG. 2a

Option value Option Value field in an application-aware ID option Application-aware ID Option field:

| Service level agreement SLA level | Application identifier APP ID | User identifier User ID | Flow identifier Flow ID of an application | Another network performance parameter Arguments |
|---|---|---|---|---|

FIG. 2b

Option value Option Value field in an application-aware ID option Application-aware ID Option field:

| Locator address Locator Address | Function identifier Function ID | Another network performance parameter Arguments |
|---|---|---|

FIG. 2c

Application parameter information option Service-para Option field:

| | Option type Option Type field | Option length Option Length field |
|---|---|---|
| Option value Option Value field | | |

FIG. 3

Option value Option Value field in an application parameter information option Service-para Option field:

| Type Type | Length Length | Class type Class Type | Reserved Reserved |
|---|---|---|---|
| Bandwidth Bandwidth | | | |

FIG. 4a

Option value Option Value field in an application parameter information option Service-para Option field:

| Type Type | Length Length | |
|---|---|---|
| Reserved Reserved | Delay Delay ||

FIG. 4b

Option value Option Value field in an application parameter information option Service-para Option field:

| Type Type | Length Length | |
|---|---|---|
| Reserved Reserved | Delay variation Delay Variation ||

FIG. 4c

Option value Option Value field in an application parameter information option Service-para Option field:

| Type Type | Length Length | |
|---|---|---|
| Reserved Reserved | Packet loss ratio Packet Loss Ratio | |

FIG. 4d

Service status option Service Status Option field (carried in an application-aware internet protocol version 6 networking APN6 option header of a first packet):

Sub-TLV field in an Option Value field of a service status option Service Status Option field:

Sub-TLV field in an Option Value field of a service status option Service Status Option field:

Value field in a sub-TLV field in an Option Value field of a service status option Service Status Option field

| E flag | I flag | Reserved Reserved |
|---|---|---|

FIG. 9a

Value field in a sub-TLV field in an Option Value field of a service status option Service Status Option field

| Reserved Reserved | Resolution level Resolution Level | Video bitrate Bitrate (Mbps) |
|---|---|---|

FIG. 9b

Value field in a sub-TLV field in an Option Value field of a service status option Service Status Option field

| Reserved Reserved | Remaining time of a buffered video Remaining Time of buffered Video (ms) |
|---|---|

FIG. 9c

Value field in a sub-TLV field in an Option Value field of a service status option Service Status Option field

| Reserved Reserved | Remaining size of a buffered video Remaining Size of buffered Video (KB) |
|---|---|

FIG. 9d

**Value field in a sub-TLV field in an Option Value field
of a service status option Service Status Option field**

| Reserved Reserved | Ratio Capacity Ratio of a remaining size of a buffered video to cache space |
|---|---|

FIG. 9e

**Value field in a sub-TLV field in an Option Value field
of a service status option Service Status Option field**

| Reserved Reserved | End-to-end delay End-to-End Delay (round trip time Round Trip Time, RTT)(μs) |
|---|---|

FIG. 9f

**Value field in a sub-TLV field in an Option Value field
of a service status option Service Status Option field**

| Reserved Reserved | End-to-end delay variation End-to-End Jitter (round trip time Round Trip Time, RTT)(μs) |
|---|---|

FIG. 9g

**Value field in a sub-TLV field in an Option Value field
of a service status option Service Status Option field**

| T field | D field | Reserved Reserved | End-to-end rate End-to-End Rate |
|---|---|---|---|

FIG. 9h

PACKET PROCESSING METHOD AND RELATED DEVICE

CROSS-REFERENCE TO RELATED APPLICATIONS

This application is a continuation of International Application No. PCT/CN2022/101358, filed on Jun. 27, 2022, which claims priority to Chinese Patent Application No. 202110713692.4, filed on Jun. 25, 2021. The disclosures of the aforementioned applications are hereby incorporated by reference in their entireties.

TECHNICAL FIELD

This application relates to the field of communications technologies, and in particular, to a packet processing method and a related device.

BACKGROUND

With the development of communication technologies, endless applications bring convenience to work and life of a user. Currently, in a running process of an application on user equipment, dynamic information reflecting a current status of the application affects quality of experience (QoE) brought by the application to the user, where the QoE reflects subjective perception of the user on quality and performance of a service provided by the application. However, if a network resource is provided for the application based only on the dynamic information, properness and effectiveness of the provided network resource cannot be ensured. Consequently, it cannot be ensured that the application brings good QoE to the user.

SUMMARY

On this basis, embodiments of this application provide a packet processing method and a related device. In a network domain in which a network device is located, a network resource can be properly and effectively provided for an application, so that the provided network resource can be for ensuring that the application brings good QoE to a user.

According to a first aspect, an embodiment of this application provides a packet processing method, applied to a network device. For example, the method may include: A network device obtains a first packet that includes first dynamic information, where the first dynamic information represents a status or a requirement corresponding to an application. The network device determines a first network resource based on the first dynamic information, and forwards, by using the first network resource, a packet corresponding to the application. Then, the network device can obtain a second network resource for forwarding a packet of the application, and can process a second packet of the application based on the second network resource, where the second network resource is determined based on a detection result of in-band flow measurement on packets of the application and second dynamic information, and the second dynamic information is dynamic information, of the application, used when the packet of the application is forwarded by using the first network resource. In this way, based on the dynamic information of the application and the detection result of in-band flow measurement in the network domain, a status of the application and actual transmission quality of the packet of the application in a network domain can be comprehensively considered, so that the second network resource that should be used in the network domain for the packet of the application can be more properly determined, and a subsequent to-be-processed packet of the application is forwarded by using the second network resource, to implement an objective of adaptively and properly planning a network resource used in the network domain. Therefore, the network resource can be properly and effectively provided for the application in the network domain, to ensure that the application brings good QoE to a user.

The network resource may include one or more of the following: a quality of service class, a forwarding path, a bandwidth, a network slice, a radio channel, or a radio frequency.

A service requirement of the application may be determined based on at least one of the following information: a threshold corresponding to the dynamic information, of the application, used when the packet of the application is forwarded by using the first network resource, application feature information, or application requirement information, where the application feature information represents an attribute of the application, the application requirement information represents a requirement of the application for a second network, and the second network is a network using a client of the application and a server of the application as boundaries.

In-band flow measurement may include but is not limited to: in-situ operations, administration, and maintenance (iOAM), in-situ flow information telemetry (iFIT), and in-band network telemetry (INT), and has high detection precision.

The dynamic information may include a status value of the application or a status indication of the application, and the status indication indicates the network device to provide an enhanced network resource for the application.

It may be understood that the first network resource may be a network resource that is determined by the network device based on the dynamic information of the application at any moment and that is for forwarding the packet of the application.

For example, the first network resource may be an enhanced network resource or a backup network resource used, in a network domain in which the network device is located, for the application when the network device determines, based on the dynamic information of the application, that the status of the application is poor. Before the network device determines the first network resource based on the first dynamic information, the method may further include: The network device determines, based on the first dynamic information, that a third network resource for forwarding a packet of the application cannot meet a service requirement of the application, where a service requirement reached by the first network resource for forwarding the packet of the application is higher than a service requirement reached by the third network resource for forwarding the packet of the application, or the first network resource is a backup network resource of the third network resource. In an example, that the network device determines, based on the first dynamic information, that a third network resource for forwarding a packet of the application cannot meet a service requirement of the application may include: The network device determines that the first dynamic information does not meet the service requirement of the application. In an embodiment, that the network device determines, based on the first dynamic information, that a third network resource for forwarding a packet of the application cannot meet a service requirement of the application may also include: The network device determines that the first dynamic information includes indication information, where the indication information indicates to perform enhancement or backup switchover on the third network resource used by the application. The indication information may be carried in an application-aware Internet Protocol version 6 networking APN6 option header included in the first packet. For example, the indication information may be carried in a sub-type length value TLV field of a service status option Service Status Option field in the APN6 option header. In one case, a type Type field or a sub type Sub Type field of the sub-TLV may be used to carry the indication information. Alternatively, in an embodiment, an I flag included in the sub-TLV may be used to carry the indication information. In this way, according to the method provided in an embodiment of the application, whether the network domain causes the poor status of the application, and whether the enhanced or backup network resource used in the network domain is proper (for example, whether transmission quality that is in the network domain for the application after the first network resource is used meets the service requirement of the application, and/or whether a status of the application is effectively improved after the first network resource is used) are determined based on the dynamic information and the detection result of in-band flow measurement. Therefore, the objective of adaptively and properly planning the network resource used in the network domain is implemented, so that the network resource can be properly and effectively provided for the application in the network domain, to ensure that the application brings good QoE to the user.

It should be noted that, if the first network resource is an enhanced network resource of the third network resource, it may be considered that the service requirement provided for the application when the packet of the application is forwarded in the network domain by using the third network resource is lower than the service requirement provided for the application when the packet of the application is forwarded in the network domain by using the first network resource. For example, the service requirement of the application is on a delay. In a same normal case, if a delay in forwarding the packet of the application in the network domain by using the third network resource is 30 milliseconds, a delay in forwarding the packet of the application by using the enhanced network resource, namely, the first network resource, of the third network resource may be 15 milliseconds. If the first network resource is a backup network resource of the third network resource, it may be considered that the service requirement provided for the application when the packet of the application is forwarded in the network domain by using the third network resource is the same as or similar to the service requirement provided for the application when the packet of the application is forwarded in the network domain by using the first network resource. For example, the service requirement of the application is on a bandwidth. In a same normal case, if a bandwidth occupied when the packet of the application is forwarded in the network domain by using the third network resource is 10 megabits per second (Mbps), a delay that exists when the packet of the application is forwarded by using the backup network resource, namely, the first network resource, of the third network resource may be about 10 Mbps.

For another example, the first network resource may alternatively be a network resource used, in a network domain in which the network device is located, for the application when the network device determines, based on the dynamic information of the application, that the status of the application is good. In this way, according to the method provided in an embodiment of the application, whether the network resource provided for the application in the network domain is proper can also be determined based on the dynamic information and the detection result of in-band flow measurement.

In an embodiment, the method may further include: The network device performs in-band flow measurement on the packets of the application, to obtain the detection result. In this way, the network device performs in-band flow measurement on the packets of the application, so that the network device can accurately know actual transmission quality of the packet that is of the application and that is transmitted in the network domain in which the network device is located. This provides a data basis for implementing accurate network resource planning in the network domain based on the detection result of in-band flow measurement, so that it is possible that the application brings good QoE to the user.

In an embodiment, the method may further include: After the network device determines the first network resource based on the first dynamic information, and before the network device obtains the second network resource for forwarding the packet of the application, the network device obtains a third packet, where the third packet includes the second dynamic information. In this case, that the network device obtains a second network resource for forwarding a packet of the application may include: The network device determines the second network resource based on the detection result and the second dynamic information. In this way, the network device can determine, based on the detection result and the second dynamic information, the second network resource for forwarding the packet of the application, to implement the objective of adaptively and properly planning the network resource used in the network domain, and ensure that the application brings good QoE to the user.

In an embodiment, the method may further include: After the network device determines the first network resource based on the first dynamic information, and before the network device obtains the second network resource for forwarding the packet of the application, the network device obtains a third packet including the second dynamic information, and sends the second dynamic information to a controller. In this case, that the network device obtains a second network resource for forwarding a packet of the application may include: The network device receives the second network resource sent by the controller, where the second network resource is determined by the controller based on the detection result and the second dynamic information. In this way, the controller can determine, based on the obtained detection result and the second dynamic information, the second network resource for forwarding the packet of the application, and send the second network resource to the network device, so that it is possible for the network device to process the subsequent packet of the application based on the proper second network resource, to implement the objective of adaptively and properly planning the network resource used in the network domain, and ensure that the application brings good QoE to the user.

In an embodiment, if the detection result and the second dynamic information meet a preset first condition, the first network resource is the same as the second network resource.

In an example, the preset first condition may include: The detection result meets the service requirement of the application, and the dynamic information of the application indicates that a status of the application is improved or the requirement of the application is met. When the first condition is met, it indicates that the enhanced or backup first network resource used in the first network is effective to ensure that the status of the application meets the service requirement of the application, and QoE deterioration can be effectively avoided. In this way, the first network resource can still be used in the network domain for forwarding the packet of the application.

In an embodiment, the preset first condition may alternatively include: The detection result does not meet the service requirement of the application. When the first condition is met, it indicates that after the first network resource is used in the first network, transmission quality in the first network for the application still cannot meet the service requirement. Therefore, it is determined that the first network does not have a capability of providing a service meeting the service requirement for the application, and has a risk of breach of contract. In this way, in one case, to reduce overheads caused by network resource switching, the network resource used in the first network may not be changed, in other words, the first network resource is still used. In an embodiment, to avoid abuse of a network resource, the network resource may be degraded in the first network, and another network resource whose provided service requirement is lower than that of the first network resource is used for providing a service for the application. In this example, the network device may further generate and send alarm information to a network management device, to notify the network management device that the first network does not have a service capability of providing the corresponding service requirement for the application. The network management device may be any device having a management and control function for the first network. For example, the network management device may be a controller.

In an embodiment, if the detection result and the second dynamic information meet a preset second condition, a service requirement reached by the second network resource for forwarding the packet of the application is lower than the service requirement reached by the first network resource for forwarding the packet of the application, or the second network resource is a backup network resource of the first network resource.

In an example, the preset second condition may include: The detection result meets the service requirement of the application, but the dynamic information of the application indicates that a status of the application is not improved or the requirement of the application is not met. When the second condition is met, it indicates that, when the first network resource is used in the first network, although the transmission quality of the packet of the application in the first network can meet the service requirement of the application, it is invalid to ensure that the status of the application meets the service requirement of the application, and QoE deterioration cannot be effectively avoided. In this example, it can be determined that poor QoE of the application is not caused by the first network, and a cause of QoE deterioration may include but is not limited to: a problem of an upstream network and a downstream network of the first network, and/or a disadvantage of the application (where for example, the application intends to occupy an enhanced network resource or a backup network resource by carrying untrue dynamic information in a packet). In this case, to ensure properness of a network resource, the network device may cancel use of the first network resource in the first network or degrade the currently used first network resource, for example, use the third network resource in the first network or use a network resource whose service requirement is lower than that provided by the third network resource. In an embodiment, to prevent the network device from using the first network resource for the application again in the first network in short time, frozen time may be further set, and the first network resource is no longer used for the application in the first network in the frozen time. In this way, a problem that a processing resource is wasted because of continuous invalid network resource adjustment can be resolved, and abuse and misuse of a network resource can be avoided.

According to a second aspect, an embodiment of this application further provides a packet processing method. The method is performed by a controller. For example, the method may include: The controller obtains a detection result of in-band flow measurement on packets of an application in a first network resource and second dynamic information, where the second dynamic information is dynamic information, of the application, used when a packet of the application is forwarded by using the first network resource, the first network resource is determined by a first network device based on first dynamic information in a received first packet, the first network device forwards, by using the first network resource, the packet corresponding to the application, and the first dynamic information represents a status or a requirement corresponding to the application. Then, the controller determines, based on the detection result and the second dynamic information, a second network resource for forwarding a packet of the application, and sends the second network resource to the first network device, to indicate the first network device to process a second packet of the application based on the second network resource.

In an embodiment, that the controller obtains a detection result of in-band flow measurement on packets of an application in a first network resource may include: The controller receives detection information of in-band flow measurement on the packets of the application in a first network in the first network resource, where the first network is a network using the first network device as a boundary, a network using a client of the application and a server of the application as boundaries is denoted as a second network, and the second network includes the first network. The controller determines the detection result based on the received detection information.

In an embodiment, that the controller obtains a detection result of in-band flow measurement on packets of an application in a first network resource may include: The controller receives the detection result sent by a second network device.

In an embodiment, if the detection result and the second dynamic information meet a preset first condition, the first network resource is the same as the second network resource.

In an example, the preset first condition includes: The detection result meets a service requirement of the application, and the dynamic information of the application indicates that a status of the application is improved or the requirement of the application is met.

In an embodiment, the preset first condition includes: The detection result does not meet a service requirement of the application. The method may further include: The controller sends a third network resource to the first network device, where the third network resource enables the first network to have a capability of providing the service requirement of the application for the application, the first network is the network using the first network device as the boundary, the network using the client of the application and the server of the application as the boundaries is denoted as the second network, and the second network includes the first network.

In an embodiment, if the detection result and the second dynamic information meet a preset second condition, a service requirement reached by the second network resource for forwarding the packet of the application is lower than a service requirement reached by the first network resource for forwarding the packet of the application, or the second network resource is a backup network resource of the first network resource.

In an example, the preset second condition includes: The detection result meets a service requirement of the application, but the dynamic information of the application indicates that a status of the application is not improved or the requirement of the application is not met.

The network resource includes one or more of the following: a quality of service class, a forwarding path, a bandwidth, a network slice, a radio channel, or a radio frequency.

The service requirement of the application is determined based on at least one of the following information: a threshold corresponding to the dynamic information, of the application, used when the packet of the application is forwarded by using the first network resource, application feature information, or application requirement information, where the application feature information represents an attribute of the application, the application requirement information represents a requirement of the application for the second network, and the second network is the network using the client of the application and the server of the application as the boundaries.

In-band flow measurement includes in-situ operations, administration, and maintenance iOAM or in-situ flow information telemetry iFIT.

It should be noted that, for an implementation and an effect of the packet processing method provided in the second aspect, refer to the descriptions of the embodiment related to determining the second network resource by the controller in the method shown in the first aspect.

According to a third aspect, an embodiment of this application further provides a packet processing apparatus, used in a network device, and the apparatus may include a first obtaining unit, a first determining unit, a second obtaining unit, and a processing unit. The first obtaining unit is configured to obtain a first packet, where the first packet includes first dynamic information of the first packet, and the first dynamic information represents a status or a requirement corresponding to an application. The first determining unit is configured to determine a first network resource based on the first dynamic information, where the network device forwards, by using the first network resource, a packet corresponding to the application. The second obtaining unit is configured to obtain a second network resource for forwarding a packet of the application, where the second network resource is determined based on a detection result of in-band flow measurement on packets of the application and second dynamic information, and the second dynamic information is dynamic information, of the application, used when the packet of the application is forwarded by using the first network resource. The processing unit is configured to process a second packet of the application based on the second network resource.

In an embodiment, the apparatus may further include a second determining unit. The second determining unit is configured to: before the first network resource is determined based on the first dynamic information, determine, based on the first dynamic information, that a third network resource for forwarding a packet of the application cannot meet a service requirement of the application, where a service requirement reached by the first network resource for forwarding the packet of the application is higher than a service requirement reached by the third network resource for forwarding the packet of the application, or the first network resource is a backup network resource of the third network resource.

In an embodiment, the second determining unit is configured to determine that the first dynamic information does not meet the service requirement of the application.

In an embodiment, the second determining unit is configured to determine that the first dynamic information includes indication information, where the indication information indicates to perform enhancement or backup switchover on the third network resource used by the application. The indication information may be carried in an application-aware Internet Protocol version 6 networking APN6 option header included in the first packet. For example, the indication information may be carried in a sub-type length value TLV field of a service status option Service Status Option field in the APN6 option header. In one case, a type Type field or a sub type Sub Type field of the sub-TLV may be used to carry the indication information. Alternatively, in an embodiment, an I flag included in the sub-TLV may be used to carry the indication information.

In an embodiment, the apparatus may further include a detection unit. The detection unit is configured to perform in-band flow measurement on the packets of the application, to obtain the detection result.

In an embodiment, the apparatus may further include a third obtaining unit. The third obtaining unit is configured to: after the first network resource is determined based on the first dynamic information and before the second network resource for forwarding the packet of the application is obtained, obtain a third packet, where the third packet includes the second dynamic information. The second obtaining unit is configured to determine the second network resource based on the detection result and the second dynamic information.

In an embodiment, the apparatus may further include a third obtaining unit and a first sending unit. The third obtaining unit is configured to: after the first network resource is determined based on the first dynamic information and before the second network resource for forwarding the packet of the application is obtained, obtain a third packet, where the third packet includes the second dynamic information. The first sending unit is configured to send the second dynamic information to a controller. The second obtaining unit is configured to: receive the second network resource sent by the controller, where the second network resource is determined by the controller based on the detection result and the second dynamic information.

In an embodiment, if the detection result and the second dynamic information meet a preset first condition, the first network resource is the same as the second network resource.

In an example, the preset first condition includes: The detection result meets the service requirement of the application, and the dynamic information of the application indicates that a status of the application is improved or the requirement of the application is met.

In an embodiment, the preset first condition includes: The detection result does not meet the service requirement of the application. The apparatus further includes a second sending unit. The second sending unit is configured to send alarm information to a network management device, where the alarm information indicates that a first network does not have a capability of providing the service requirement of the application for the application, the first network is a network using the network device as a boundary, a network using a client of the application and a server of the application as boundaries is denoted as a second network, and the second network includes the first network.

In an embodiment, if the detection result and the second dynamic information meet a preset second condition, a service requirement reached by the second network resource for forwarding the packet of the application is lower than the service requirement reached by the first network resource for forwarding the packet of the application, or the second network resource is a backup network resource of the first network resource.

In an example, the preset second condition includes: The detection result meets the service requirement of the application, but the dynamic information of the application indicates that a status of the application is not improved or the requirement of the application is not met.

According to a fourth aspect, an embodiment of this application further provides a packet processing apparatus, used in a controller. The apparatus may include an obtaining unit, a determining unit, and a first sending unit. The obtaining unit is configured to obtain a detection result of in-band flow measurement on packets of an application in a first network resource and second dynamic information, where the second dynamic information is dynamic information, of the application, used when a packet of the application is forwarded by using the first network resource, the first network resource is determined by a first network device based on first dynamic information in a received first packet, the first network device forwards, by using the first network resource, the packet corresponding to the application, and the first dynamic information represents a status or a requirement corresponding to the application. The determining unit is configured to determine, based on the detection result and the second dynamic information, a second network resource for forwarding a packet of the application. The first sending unit is configured to send the second network resource to the first network device, to indicate the first network device to process a second packet of the application based on the second network resource.

In an embodiment, the obtaining unit includes a receiving subunit and a determining subunit. The receiving subunit is configured to receive detection information of in-band flow measurement on the packets of the application in a first network in the first network resource, where the first network is a network using the first network device as a boundary, a network using a client of the application and a server of the application as boundaries is denoted as a second network, and the second network includes the first network. The determining subunit is configured to determine the detection result based on the received detection information.

In an embodiment, the obtaining unit is configured to receive the detection result sent by a second network device.

In an embodiment, if the detection result and the second dynamic information meet a preset first condition, the first network resource is the same as the second network resource.

In an example, the preset first condition includes: The detection result meets a service requirement of the application, and the dynamic information of the application indicates that a status of the application is improved or the requirement of the application is met.

In an embodiment, the preset first condition includes: The detection result does not meet a service requirement of the application. The apparatus may further include a second sending unit. The second sending unit is configured to send a third network resource to the first network device, where the third network resource enables a first network to have a capability of providing the service requirement of the application for the application, the first network is a network using the first network device as a boundary, a network using a client of the application and a server of the application as boundaries is denoted as a second network, and the second network includes the first network.

In an embodiment, if the detection result and the second dynamic information meet a preset second condition, a service requirement reached by the second network resource for forwarding the packet of the application is lower than a service requirement reached by the first network resource for forwarding the packet of the application, or the second network resource is a backup network resource of the first network resource.

In an example, the preset second condition includes: The detection result meets a service requirement of the application, but the dynamic information of the application indicates that a status of the application is not improved or the requirement of the application is not met.

In the third aspect or the fourth aspect, the network resource includes one or more of the following: a quality of service class, a forwarding path, a bandwidth, a network slice, a radio channel, or a radio frequency.

In the third aspect or the fourth aspect, the service requirement of the application may be determined based on at least one of the following information: a threshold corresponding to the dynamic information, of the application, used when the packet of the application is forwarded by using the first network resource, application feature information, or application requirement information, where the application feature information represents an attribute of the application, the application requirement information represents a requirement of the application for the second network, and the second network is the network using the client of the application and the server of the application as the boundaries.

In the third aspect or the fourth aspect, in-band flow measurement includes in-situ operations, administration, and maintenance iOAM or in-situ flow information telemetry iFIT.

In the third aspect or the fourth aspect, the dynamic information includes a status value of the application or a status indication of the application, and the status indication indicates the network device to provide an enhanced network resource for the application.

It should be noted that the packet processing apparatus provided in the third aspect corresponds to the method provided in the first aspect. For an implementation and an effect achieved, refer to related descriptions of the method shown in the first aspect.

It should be noted that the packet processing apparatus provided in the fourth aspect corresponds to the method provided in the second aspect. For an implementation and an effect achieved, refer to related descriptions of the method shown in the second aspect.

According to a fifth aspect, an embodiment of this application further provides a network device, including a processor and a memory. The memory is configured to store a computer program or instructions, and the processor is configured to invoke the computer program or the instructions stored in the memory, to enable the network device to perform the method provided in the first aspect.

According to a sixth aspect, an embodiment of this application further provides a controller, including a processor and a memory. The memory is configured to store a computer program or instructions, and the processor is configured to invoke the computer program or the instructions stored in the memory, to enable the controller to perform the method provided in the second aspect.

According to a seventh aspect, an embodiment of this application further provides a communication system, including a network device and a controller. The network device is configured to perform the method provided in the first aspect, and the controller is configured to perform the method provided in the second aspect.

According to an eighth aspect, an embodiment of this application further provides a computer-readable storage medium, including instructions. When the instructions are run on a computer, the computer is enabled to perform the method provided in the first aspect or the second aspect.

According to a ninth aspect, an embodiment of this application further provides a computer program product, including a program. When the program runs on a processor, the method provided in the first aspect or the second aspect is implemented.

According to a tenth aspect, an embodiment of this application further provides a chip, including a processor and an interface circuit. The interface circuit is configured to receive code instructions and transmit the code instructions to the processor. The processor is configured to run the code instructions to perform the method according to the first aspect or the second aspect.

BRIEF DESCRIPTION OF DRAWINGS

FIG. 1 is a schematic diagram of a format of an application-aware ID option field according to an embodiment of this application;

FIG. 2a is a schematic diagram of a format of an option value field of an application-aware ID option field according to an embodiment of this application;

FIG. 2b is a schematic diagram of another format of an option value field of an application-aware ID option field according to an embodiment of this application;

FIG. 2c is a schematic diagram of still another format of an option value field of an application-aware ID option field according to an embodiment of this application;

FIG. 3 is a schematic diagram of a format of an application parameter information option field according to an embodiment of this application;

FIG. 4a is a schematic diagram of a format of an option value field of an application parameter information option field according to an embodiment of this application;

FIG. 4b is a schematic diagram of another format of an option value field of an application parameter information option field according to an embodiment of this application;

FIG. 4c is a schematic diagram of still another format of an option value field of an application parameter information option field according to an embodiment of this application;

FIG. 4d is a schematic diagram of yet another format of an option value field of an application parameter information option field according to an embodiment of this application;

FIG. 9a is a schematic diagram of a format of a Value in a sub-TLV field in a service status option field according to an embodiment of this application;

FIG. 9b is a schematic diagram of a format of a Value in a sub-TLV field in a service status option field according to an embodiment of this application;

FIG. 9c is a schematic diagram of a format of a Value in a sub-TLV field in a service status option field according to an embodiment of this application;

FIG. 9d is a schematic diagram of a format of a Value in a sub-TLV field in a service status option field according to an embodiment of this application;

FIG. 9e is a schematic diagram of a format of a Value in a sub-TLV field in a service status option field according to an embodiment of this application;

FIG. 9f is a schematic diagram of a format of a Value in a sub-TLV field in a service status option field according to an embodiment of this application;

FIG. 9g is a schematic diagram of a format of a Value in a sub-TLV field in a service status option field according to an embodiment of this application;

FIG. 9h is a schematic diagram of a format of a Value in a sub-TLV field in a service status option field according to an embodiment of this application;

DESCRIPTION OF EMBODIMENTS

Figure 5:
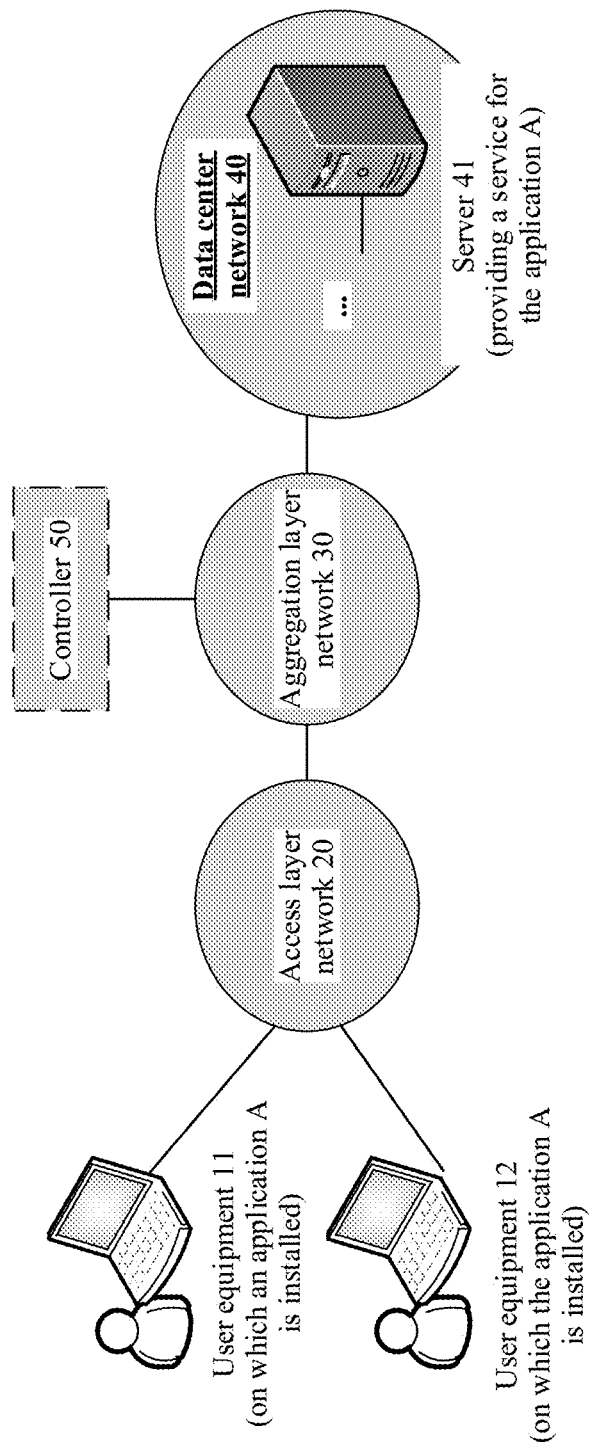
FIG. 5 is a schematic diagram of a structure of a scenario according to an embodiment of this application.

The following describes technical solutions of embodiments in this application with reference to accompanying drawings. A network architecture and a service scenario described in embodiments of this application are intended to describe the technical solutions in embodiments of this application more clearly, and do not constitute a limitation on the technical solutions provided in embodiments of this application. Persons of ordinary skill in the art may know that: With the evolution of the network architecture and the emergence of new service scenarios, the technical solutions provided in embodiments of this application are also applicable to a similar technical problem.

Ordinal numbers such as "1", "2", "3", "first", "second", and "third" in embodiments of this application are used to distinguish between a plurality of objects, but are not used to limit a sequence of the plurality of objects.

"A and/or B" mentioned in embodiments of this application should be understood as including the following cases: Only A is included, only B is included, or both A and B are included.

In a running process of an application on user equipment, a network (where for example, the network may include an access layer network, an aggregation layer network, and a data center network) between the user equipment and a server of the application provides a network service corresponding to the application for a user. It is found through research on the application running process that some indicators of the application on the user equipment in the running process affect QoE brought by the application to the user, and consequently affects subjective perception of the user on quality and performance of a service provided by the application. For example, for a video live broadcast application or an on-demand application, remaining video time in a buffer of a client of the application on the user equipment or a remaining size in the buffer may affect whether a freeze event occurs when the user uses the application, and occurrence of the freeze event brings poor QoE to the user. For another example, for an application such as a battle game or a cloud game, an end-to-end round-trip time (RTT) delay measured by a client of the application on the user equipment may determine whether a misoperation occurs when the user uses the application, and occurrence of the misoperation may bring poor QoE to the user.

In order for the network between the user equipment and the server to sense parameters (denoted as dynamic information below) that affect QoE brought by the application to the user, the dynamic information of the application may be carried in a packet and transmitted in the network, so that a network device receiving the packet can perform targeted processing on the packet based on the dynamic information. In this way, the dynamic information of the application is considered in a packet processing process, so that the application can bring good QoE to the user. Therefore, user experience brought by the application to the user can be improved, so that control on the application is more accurate.

For example, the network device determines, based on the dynamic information, that a status of the application is poor and a service requirement of the application cannot be met. In this case, to bring better QoE to the user, the network device may use an enhanced network resource for the application in a network domain (for example, an aggregation layer network) in which the network device is located, or the network device may perform switching to a backup network resource for the application in a network domain in which the network device is located, so that a service that meets the service requirement of the application is provided for the application in the network domain. However, in causes of the poor status of the application, that an exception occurs in the network domain to which the network device belongs may only be one possible cause, and another possible cause may be an exception of another network domain or a disadvantage of the application. Consequently, the enhanced network resource or the backup network resource used in the network domain in which the network device is located may alternatively be invalid and improper for improving a status of the application. That is, if the network resource is provided for the application based only on the dynamic information, properness and effectiveness of the provided network resource cannot be ensured. Consequently, it cannot be ensured that the application brings good QoE to the user, and misuse or abuse of the network resource is even caused in some scenarios.

On this basis, embodiments of this application provide a packet processing method. When determining a first network resource based on dynamic information, a network device performs in-band flow measurement in a network domain in which the first network resource is used, to detect actual transmission quality of a packet of an application in the network domain. By comprehensively considering dynamic information, of the application, used when the packet of the application is forwarded by using the first network resource and a detection result of in-band flow measurement in the network domain, the network device obtains a second network resource for forwarding a packet of the application, and forwards a subsequent packet of the application for the application in the network domain by using the second network resource. In this way, based on the dynamic information of the application and the detection result of in-band flow measurement in the network domain, a more proper second network resource can be determined, and the subsequent to-be-processed packet of the application is forwarded by using the second network resource, to implement an objective of adaptively and properly planning a network resource used in the network domain. Therefore, a network resource can be properly and effectively provided for the application in the network domain, to ensure that the application brings good QoE to a user.

The first network resource may be a network resource that is determined by the network device at any moment based on the dynamic information of the application and that is for forwarding the packet of the application. For example, the first network resource may be an enhanced network resource or a backup network resource used, in a network domain in which the network device is located, for the application when the network device determines, based on the dynamic information of the application, that a status of the application is poor. In this way, in embodiments of this application, whether the network domain causes the poor status of the application can be determined based on the dynamic information and the detection result of in-band flow measurement, to determine whether the enhanced network resource or the backup network resource used in the network domain is proper (for example, whether transmission quality that is in the network domain for the application after the first network resource is used meets a service requirement of the application, and/or whether a status of the application is effectively improved after the first network resource is used). For another example, the first network resource may alternatively be a network resource used, in a network domain in which the network device is located, for the application when the network device determines, based on the dynamic information of the application, that a status of the application is good. In this way, in embodiments of this application, whether the network resource provided for the application in the network domain is proper can also be determined based on the dynamic information and the detection result of in-band flow measurement. In the following descriptions, an example is used in which the first network resource may be the enhanced network resource or the backup network resource used, in the network domain in which the network device is located, for the application when the network device determines, based on the dynamic information of the application, that the status of the application is poor.

For ease of understanding this application, the following first explains meanings of some concepts in this application.

Dynamic information: represents a related status or requirement of an application, and may reflect a status in a running process of the application. The dynamic information representing the status or requirement of the application may include but is not limited to: a related parameter in the running process of the application or a status indication corresponding to the related parameter. For example, the dynamic information may be at least one of the following information: a resolution level of the application, a video bit rate of the application, remaining time of a buffered video of the application, a remaining size of a buffered video of the application, a ratio of a remaining size of a buffered video of the application to total buffer space, or a ratio of remaining time of a buffered video of the application to total video time. For another example, the dynamic information may alternatively be a status indication corresponding to any of the foregoing information. For example, the remaining time of the buffered video of the application is in a normal state, an alarm state, or another state. The dynamic information representing the related status of the application may include but is not limited to: a related parameter of a device related to the application or a status indication corresponding to the related parameter. For example, the dynamic information may be at least one of the following information: an end-to-end delay from user equipment in which the application is located to a service device of the application, an end-to-end delay variation from user equipment in which the application is located to a service device, or an end-to-end rate from user equipment in which the application is located to a service device. For another example, the dynamic information may alternatively be a status indication corresponding to any of the foregoing information. For example, the end-to-end rate from the user equipment in which the application is located to the service device is in a normal state, an alarm state, or another state.

A service requirement indicates a requirement of an application on transmission quality provided in a network domain. In embodiments of this application, the service requirement includes a requirement on quality of service (QoS) and/or QoE of the application, and the service requirement may be determined based on at least one of a threshold of dynamic information, application feature information, or application requirement information. In an example, the service requirement may be determined based on the application feature information and/or the application requirement information. For example, a delay requirement of the application for the network domain may be determined based on the application feature information and/or the application requirement information. In an embodiment, the service requirement may alternatively be determined based on the threshold that is of the dynamic information and that is agreed upon by a user and an operator. For example, a requirement of the application on a ratio of remaining time of a buffered video of the application to total video time in the network domain may be determined based on a threshold that corresponds to the ratio of the remaining time of the buffered video of the application to the total video time in the dynamic information and that is agreed upon by the user and the operator for the application.

The application feature information represents an attribute of the application. For example, the application feature information may include all or some of the following information: an application identifier (APP ID), a user identifier, a flow identifier of the application, and a service level of the application. The APP ID is used to uniquely identify an application. The application may be an application (for example, Migu) provided by an operator, or may be an application (for example, Honor of Kings) provided by an application provider (OTT). The User ID is used to identify a user to which the application belongs. The Flow ID is used to identify a service flow or a session to which a service packet sent by the application belongs. The service level is used to reflect network performance required by a service packet sent by the application, and may be, for example, a service level agreement (SLA) level or an SLA value. In addition, the application feature information may further include a network performance parameter. In an example, in a packet corresponding to the application, the application feature information may be carried in an application-aware ID option field shown in FIG. 1. The Application-aware ID Option field includes an option type field, an option length field, and an option value field. The option type field indicates that the option field is an Application-aware ID Option field, for example, a value of the option value field in the option field is the application feature information. The option length type indicates a length of the option field. The value of the option value field is the application feature information. For example, as shown in FIG. 2a, the option value field in the Application-aware ID Option field shown in FIG. 1 may include an APP ID field, a User ID field, a Flow ID field, and an SLA level. For another example, as shown in FIG. 2b, the option value field may include an APP ID field, a User ID field, a Flow ID field, an SLA level, and another network performance parameter field. For another example, as shown in FIG. 2c, the option value field may alternatively include a locator address field, a function identifier field, and an Arguments field.

The application requirement information represents a requirement of an application for a network. The application requirement information may include but is not limited to a requirement of the application on network performance such as a bandwidth, a delay, a delay variation, and a packet loss ratio In an example, in a packet corresponding to the application, the application requirement information may be carried in an application parameter information option field shown in FIG. 3. The Service-para Option field includes an Option Type field, an Option Length field, and an Option Value field. The Option Type field indicates that the option field is a Service-para Option field, for example, a value of the option value field in the option field is the application requirement information. The Option Length type indicates a length of the option field. The value of the Option Value field is the application requirement information. For example, as shown in FIG. 4a, the Option Value field in the Service-para Option field shown in FIG. 3 may include a Type field, a Length field, a class type field, a reserved field, and a bandwidth field. For another example, as shown in FIG. 4b, the Option Value field may include a Type field, a Length field, a Reserved field, and a delay field. For still another example, as shown in FIG. 4c, the Option Value field may alternatively include a Type field, a Length field, a Reserved field, and a delay variation field. For yet another example, as shown in FIG. 4d, the Option Value field may alternatively include a Type field, a Length field, a Reserved field, and a packet loss ratio field.

If the packet corresponding to the application is an internet protocol version 6 (IPv6) packet, the application feature information and the application requirement information may be carried in a flow label field, a hop-by-hop options header (HBH), or a destination options header (DOH) of an IPv6 packet header. In addition to the foregoing locations of the IPv6 packet header of the packet, if the packet corresponding to the application is a segment routing over internet protocol version 6 (SRv6) packet, the application feature information and the application requirement information may alternatively be carried in a segment routing header (SRH) field of the SRv6 packet, and may be carried in an SRH tag field in the SRH, an SRH type length value (TLV) field in the SRH, or an arguments (Args) field of each segment identifier (SID) in the SRH. The foregoing manners of carrying the application feature information and the application requirement information in the packet are merely examples, and how to carry the application feature information and the application requirement information of the application in the packet corresponding to the application is not specifically limited in this application.

In-band flow measurement is a detection technology in which a network device in a network domain measures actual service traffic sent by user equipment, for example, may include but is not limited to: in-situ operations, administration, and maintenance (iOAM), in-situ flow information telemetry (iFIT), and in-band network telemetry (INT), and has high detection precision.

A network resource is for providing a corresponding processing manner for a packet, and is a basis for forwarding the packet of an application. The network resource may include, for example, but is not limited to, one or more of the following: a quality of service class, a forwarding path, a bandwidth, a network slice, a radio channel, or a radio frequency. If the network resource is a quality of service class, a network device receiving the packet may determine a quality of service class of the packet based on a quality of service class corresponding to a network resource currently used by the application to which the packet belongs, so as to enqueue the packet into a queue corresponding to the quality of service class. If the network resource is a forwarding path, a network device receiving the packet may determine a forwarding path of the packet based on a forwarding path corresponding to a network resource currently used by the application to which the packet belongs, so as to forward the packet in the determined forwarding path. If the network resource is a bandwidth, a network device receiving the packet may determine a bandwidth of the packet based on a bandwidth corresponding to a network resource currently used by the application to which the packet belongs, so as to forward the packet at the determined bandwidth. If the network resource is a network slice, a network device receiving the packet may determine a network slice of the packet based on a network slice corresponding to a network resource currently used by the application to which the packet belongs, so as to forward the packet in the determined network slice. If the network resource includes a quality of service class and a network slice, a network device receiving the packet may determine a quality of service class and a network slice that are of the packet based on a quality of service class and a network slice that correspond to a network resource currently used by the application to which the packet belongs, so as to enqueue the packet into a queue corresponding to the quality of service class, and forward the packet in the determined network slice. If the network resource includes a quality of service class, a forwarding path, a bandwidth, a network slice, a radio channel, and a radio frequency, a network device receiving the packet may determine a quality of service class, a forwarding path, a bandwidth, a network slice, a radio channel, and a radio frequency that are of the packet based on a quality of service class, a forwarding path, a bandwidth, a network slice radio channel, and a radio frequency that correspond to a network resource currently used by the application to which the packet belongs, so as to enqueue the packet into a queue corresponding to the quality of service class, and forward the packet in the determined forwarding path, at the determined bandwidth, in the determined network slice, on the determined radio channel, and on the determined radio frequency. The quality of service class includes but is not limited to an SLA level.

It should be noted that an enhanced network resource may refer to a network resource for providing a higher service requirement for an application. The service requirement provided for the application when a packet of the application is forwarded in a network domain by using the enhanced network resource is higher than a service requirement provided for the application when a packet of the application is forwarded in the network domain by using a non-enhanced network resource. For example, a service requirement of the application is on a delay. In a same normal case, if a delay is 30 milliseconds when the packet of the application is forwarded in the network domain by using the non-enhanced network resource, a delay may be 15 milliseconds when the packet of the application is forwarded by using the enhanced network resource.

A backup network resource may refer to a network resource that provides a same or similar service requirement for an application. A service requirement provided for the application when a packet of the application is forwarded in a network domain by using a network resource before backup switchover is the same as or similar to a service requirement provided for the application when a packet of the application is forwarded in the network domain by using a network resource after backup switchover. For example, a service requirement of the application is on a bandwidth. In a same normal case, if a bandwidth occupied when the packet of the application is forwarded in the network domain by using the network resource before backup switchover is 10 megabits per second (Mbps), a delay that exists when the packet of the application is forwarded by using the network resource after backup switchover may be about 10 Mbps.

Figure 6:
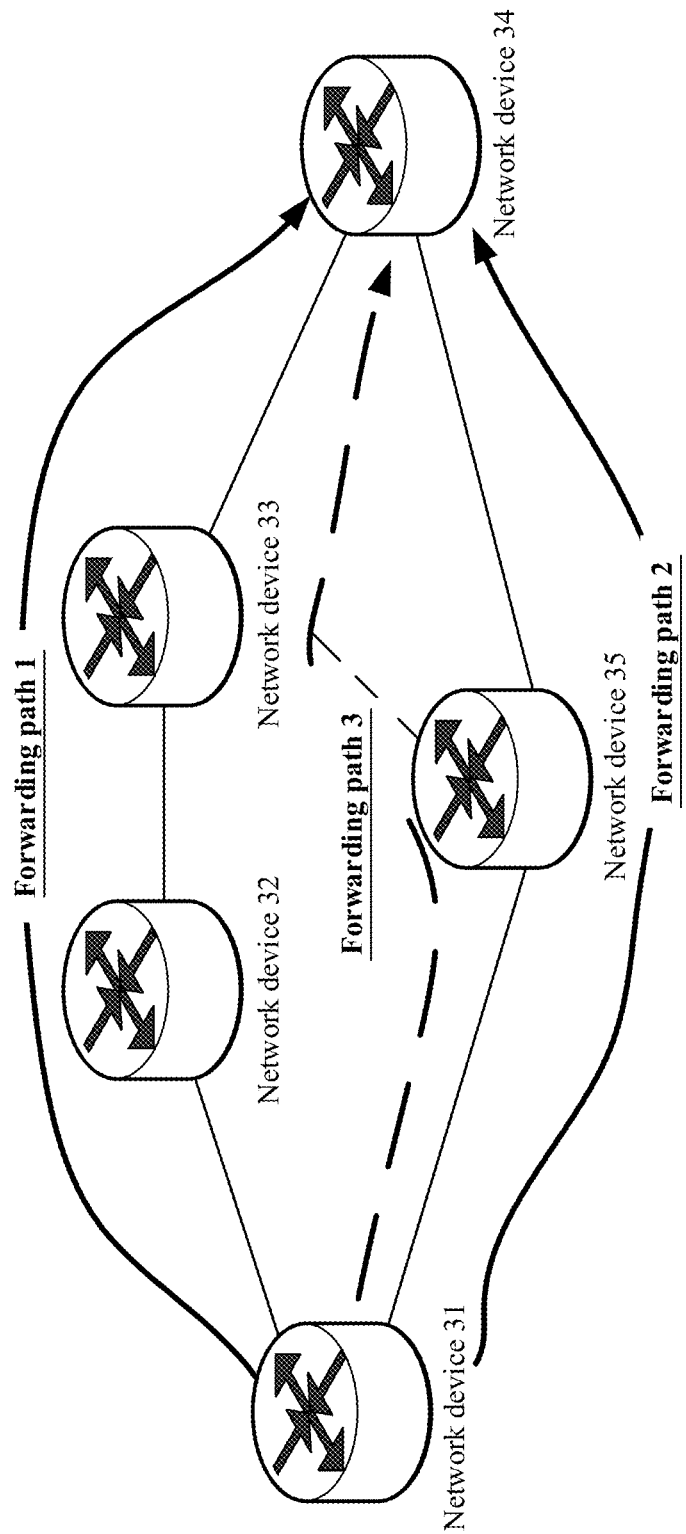
FIG. 6 is a schematic diagram of a structure of an aggregation layer network 30 in the scenario shown in FIG. 5.

For example, embodiments of this application are applicable to a scenario shown in FIG. 5. The scenario may include user equipment 11, user equipment 12, an access layer network 20, an aggregation layer network 30, and a data center network 40. An application A is installed on both the user equipment 11 and the application device 12, the data center network 40 includes servers corresponding to a plurality of applications, and the servers corresponding to the plurality of applications include a server 41 corresponding to the application A. A possible structure of the aggregation layer network 30 is shown in FIG. 6, and may include but is not limited to the following: a network device 31, a network device 32, a network device 33, a network device 34, and a network device 35. The network device 31 is a PE device that is of the access layer network 20 and that accesses the aggregation layer network 30, the network device 34 is a PE device that is of the aggregation layer network 30 and that accesses the data center network 40, and the network device 31 and the network device 34 are connected through a forwarding path 1 or a forwarding path 2. The forwarding path 1 is a path that sequentially passes through the network device 31, the network device 32, the network device 33, and the network device 34, and the forwarding path 2 is a path that sequentially passes through the network device 31, the network device 35, and the network device 34. In the following example, the aggregation layer network 30 is a first network, a network resource is a forwarding path, and a service requirement 2 provided by the forwarding path 2 for the application A is higher than a service requirement 1 provided by the forwarding path 1 for the application A. Currently, when a network resource 1 used for the application A in the aggregation layer network 30 is the forwarding path 1, a user operates the application A on the user equipment 11, so that the user equipment 11 sends a packet to the network device 31 of the aggregation layer network 30 via the access layer network 20. The packet is used as an example to describe a packet processing method provided in an embodiment of this application. Similarly, for a method for processing a packet that is sent by the user equipment 12 to the network device 31 of the aggregation layer network 30 via the access layer network 20 because the user operates the application A on the user equipment 12, refer to the following example, and details are not described.

In an example, it is assumed that the service requirement 1 is on a delay, and is that a delay of the application A is less than 50 milliseconds. A packet processing process provided in an embodiment of the application may include the following operations. S11: The network device 31 receives a packet 1 that belongs to the application A, where the packet 1 includes dynamic information 1. S12: The network device 31 determines, based on the dynamic information 1 in the packet 1, that a delay in a current status of the application A is 100 milliseconds. S13: The network device 31 determines, based on the dynamic information 1, that the delay of the application A does not meet the service requirement 1. In this case, the network device 31 provides an enhanced network resource or a backup network resource, namely, a network resource 2, for the application A, and the network device 31 starts to forward a packet of the application A by using the forwarding path 2. In addition, the network device 31 enables in-band flow measurement in the aggregation layer network 30 for the application A, to measure actual delays generated when packets of the application A are transmitted in the aggregation layer network 30. Then, in a case, when the network device 31 receives a packet 2 that belongs to the application A, the network device 31 can determine, based on dynamic information 2 in the packet 2, that a delay in a current status of the application A is 35 milliseconds, and also determine that a detection result 1 of in-band flow measurement in the aggregation layer network 30 is 30 milliseconds. In this case, the network device 31 may determine, based on the dynamic information 2, the detection result 1, and the service requirement 1, that after the network resource 2 is used in the aggregation layer network 30, transmission quality for the application A in the aggregation layer network 30 meets the service requirement 1 (that is, 30 ms is less than 50 ms), but also the current status of the application A is improved (that is, 35 ms is less than 50 ms). Therefore, it is determined that a measure of providing the network resource 2 for the application A in the aggregation layer network 30 in S13 effectively avoids QoE deterioration, and the network device 31 keeps using the network resource 2 in the aggregation layer network 30, that is, uses the forwarding path 2 to forward the packet 2. In an embodiment, when the network device 31 receives a packet 2' that belongs to the application A, the network device 31 can determine, based on dynamic information 2' in the packet 2', that a delay in a current status of the application A is 86 milliseconds, and determine that a detection result 1' of in-band flow measurement in the aggregation layer network 30 is 28 milliseconds. In this case, the network device 31 may determine, based on the dynamic information 2', the detection result 1', and the service requirement 1, that after the network resource 2 is used in the aggregation layer network 30, although transmission quality for the application A in the aggregation layer network 30 meets the service requirement 1 (that is, 28 ms is less than 50 ms), the current status of the application A is not improved (that is, 86 ms is greater than 50 ms). Therefore, it is determined that a measure of providing the network resource 2 for the application A in the aggregation layer network 30 in S13 does not improve the current status of the application A, that is, poor QoE of the application A is not caused by the aggregation layer network 30. A cause of QoE deterioration may include but is not limited to: an exception in an upstream network (such as the access layer network 20) or a downstream network (such as the data center network 40) of the aggregation layer network 30 and/or a disadvantage of the application A. In this case, to ensure properness of a network resource, the network device 31 cancels use of the network resource 2 or degrades the network resource 2 in the aggregation layer network 30, for example, uses the forwarding path 1 to forward the packet 2'. In an embodiment, to prevent the network device 31 from using the enhanced network resource for the application A again in the aggregation layer network 30 in short time, frozen time (for example, 10 minutes) may be further set, and the network resource is no longer switched for the application A in the aggregation layer network 30 within the frozen time. In an embodiment, when the network device 31 receives a packet 2" that belongs to the application A, the network device 31 determines that a detection result 1" of in-band flow measurement in the aggregation layer network 30 is 80 milliseconds. In this case, the network device 31 may determine, based on the detection result 1" and the service requirement 1, that after the network resource 2 is used in the aggregation layer network 30, transmission quality for the application A in the aggregation layer network 30 still cannot meet the service requirement 1 (that is, 80 ms is greater than 50 ms). Therefore, it is determined that the aggregation layer network 30 does not have a capability of providing a service meeting the service requirement 1 for the application A, and has a risk of breach of contract. In this case, the network device 31 may continue to use the network resource 2 in the aggregation layer network 30, for example, forward the packet 2" by using the forwarding path 2. In this case, to notify an actual situation of the aggregation layer network 30, the network device 31 may further generate and send alarm information to a network management device, to indicate that the aggregation layer network 30 does not have the capability of providing the service corresponding to the service requirement 1 for the application A, so that the network management device can learn of the actual situation of the aggregation layer network 30, and the network management device can more properly manage and control the aggregation layer network 30 and the application A. In an embodiment, the network device 31 may further obtain a new network resource 3. The network resource 3 may be a forwarding path 3 that is recalculated and sent by the network management device or a controller to the network device 31 and that is from the network device 31 to the network device 34, or may be a forwarding path 3 that is configured by the network device 31 and that is from the network device 31 to the network device 34, so that the aggregation layer network 30 has the capability of providing the service corresponding to the service requirement 1 for the application A, and the network device 31 starts to use the forwarding path 3 in the aggregation layer network 30, in other words, uses the forwarding path 3 to forward a subsequent packet of the application A.

In an embodiment, if the scenario shown in FIG. 5 further includes a controller 50, the controller 50 can interact with each network device in the aggregation layer network 30, so as to manage and control the aggregation layer network 30. It is assumed that a service requirement 2 is on a ratio of a remaining size of a buffered video of an application to total buffer space, and is that a ratio of a remaining size of a buffered video of the application A to the total buffer space is greater than 60%, and when the ratio of the remaining size of the buffered video of the application to the total buffer space is greater than 60%, a corresponding bandwidth is greater than 10 megabits per second (Mbps). A packet processing process provided in an embodiment of the application may include the following operations. S21: The network device 31 receives a packet 1 that belongs to the application A, where the packet 1 includes dynamic information 1. S22: The network device 31 determines, based on the dynamic information 1 in the packet 1, that a ratio of a remaining size of the buffered video of the application A to the total buffer space in a current status of the application A is 30%. S23: The network device 31 determines, based on the dynamic information 1, that the ratio of the remaining size of the buffered video of the application A to the total buffer space does not meet the service requirement 2. In this case, the network device 31 provides an enhanced network resource or a backup network resource, namely, a network resource 2, for the application A. In addition, the network device 31 enables in-band flow measurement in the aggregation layer network 30 for the application A, to measure actual delays generated when packets of the application A are transmitted in the aggregation layer network 30. Then, in a case, when the network device 31 receives a packet 2 that belongs to the application A, the network device 31 may send dynamic information 2 carried in the packet 2 to the controller 50, and the controller 50 obtains a detection result 1 of in-band flow measurement in the aggregation layer network 30 (for example, receives the detection result 1 from the network device 34, or obtains the detection result 1 by processing detection information, of in-band flow measurement, received from the network device 31, the network device 35, and the network device 34). The controller 50 may determine, based on the dynamic information 2, that a ratio of a remaining size of the buffered video of the application to the total buffer space in a current status of the application A is 75%, and determine that the detection result 1 of in-band flow measurement in the aggregation layer network 30 is 20 Mbps. Therefore, the controller 50 may determine, based on the dynamic information 2, the detection result 1, and the service requirement 2, that after the network resource 2 is used in the aggregation layer network 30, not only transmission quality for the application A in the aggregation layer network 30 meets the service requirement 2 (that is, 20 Mbps is greater than 10 Mbps), but also the current status of the application A is improved (that is, 75% is greater than 60%). Therefore, it is determined that a measure of providing the enhanced or backup network resource 2 for the application A in the aggregation layer network 30 in S23 effectively avoids QoE deterioration. Therefore, the controller 50 may send the network resource 2 or indication information 1 to the network device 31, to indicate the network device 31 to keep using the network resource 2 in the aggregation layer network 30, that is, use the forwarding path 2 to forward the packet 2. In an embodiment, when the network device 31 receives a packet 2' that belongs to the application A, the network device 31 may send, to the controller 50, dynamic information 2' carried in the packet 2', and the controller 50 obtains a detection result 1' of in-band flow measurement in the aggregation layer network 30. Therefore, the controller 50 may determine, based on the dynamic information 2', that a ratio of a remaining size of the buffered video of the application to the total buffer space in a current status of the application A is 35%, and determine that the detection result 1' of in-band flow measurement in the aggregation layer network 30 is 22 Mbps. In this way, the controller 50 may determine, based on the dynamic information 2', the detection result 1', and the service requirement 2, that after the network resource 2 is used in the aggregation layer network 30, although transmission quality for the application A in the aggregation layer network 30 meets the service requirement 2 (that is, 22 Mbps is greater than 10 Mbps), the current status of the application A is not improved (that is, 35% is less than 60%). Therefore, it is determined that a measure of providing the network resource 2 for the application A in the aggregation layer network 30 in S23 does not improve the current status of the application A, that is, poor QoE of the application A is not caused by the aggregation layer network 30. A cause of QoE deterioration may include but is not limited to: an exception in an upstream network (such as the access layer network 20) or a downstream network (such as the data center network 40) of the aggregation layer network 30 and/or a disadvantage of the application A. Therefore, to ensure properness of a network resource, the controller 50 may send indication information 2 to the network device 31, to indicate the network device 31 to cancel use of the network resource 2 or degrade the network resource 2 in the aggregation layer network 30. For example, the controller 50 sends the network resource 1 to the network device 31, to indicate the network device 31 to forward the packet 2' by using the forwarding path 1. In an embodiment, when the network device 31 receives a packet 2" that belongs to the application A, the network device 31 may send, to the controller 50, dynamic information 2" carried in the packet 2", and the controller 50 obtains a detection result 1" of in-band flow measurement in the aggregation layer network 30. Therefore, the controller 50 may determine, based on the dynamic information 2", that a ratio of a remaining size of the buffered video of the application to the total buffer space in a current status of the application A is 35%, and determine that the detection result 1" of in-band flow measurement in the aggregation layer network 30 is 5 Mbps. Therefore, the controller 50 may determine, based on the detection result 1" and the service requirement 2, that after the network resource 2 is used in the aggregation layer network 30, transmission quality for the application A in the aggregation layer network 30 still cannot meet the service requirement 2 (that is, 5 Mbps is less than 10 Mbps), and determine that the aggregation layer network 30 does not have a capability of providing a service meeting the service requirement 2 for the application A, and has a risk of breach of contract. In this case, the controller 50 may send the network resource 2 or indication information 3 to the network device 31, to indicate the network device 31 to keep using the forwarding path 2 in the aggregation layer network 30, that is, use the forwarding path 2 to forward the packet 2". In this case, the network device 31 or the controller 50 may further generate and send alarm information to a network management device, to indicate that the aggregation layer network 30 does not have a capability of providing the service corresponding to the service requirement 2 for the application A.

It can be learned that the foregoing two examples respectively describe a possible case in which dynamic information is inconsistent with an indicator of in-band flow measurement in the scenario including the controller 50 and a possible case in which dynamic information is consistent with an indicator of in-band flow measurement in the scenario not including the controller 50. According to the packet processing method provided in an embodiment of the application, whether the enhanced or backup network resource used in the network domain is proper can be accurately determined based on the dynamic information of the application and the detection result of in-band flow measurement in the network domain, to adaptively and properly plan a network resource used in the network domain, so that the network resource can be properly and effectively provided for the application in the network domain, to ensure that the application brings good QoE to the user.

It should be noted that in the method provided in an embodiment of the application, a network between user equipment in which an application is located and a server of the application is used as a whole, and is denoted as a second network, and one or more network domains in the second network are denoted as a first network.

It should be noted that, in an embodiment of the application, a service requirement of the application in the second network between a client of the application and the server of the application may be the same as or different from a service requirement of the application in the first network in which the network device is located. For example, a service requirement of the application is on a delay, if the service requirement of the application in the second network is that a delay is less than 50 milliseconds, the service requirement of the application in the first network may be that a delay is less than 50 milliseconds, or the service requirement of the application in the first network may be that a delay is less than 30 milliseconds. This is not limited in an embodiment of the application. In an embodiment of the application, an example in which the service requirement of the application in the second network is the same as the service requirement of the application in the first network is used for description.

The method provided in an embodiment of the application is applicable to packet processing processes corresponding to different applications, and can also be applicable to packet processing of a same application from different user equipment. However, a packet processing process of each application of each user equipment is independently decoupled to perform the method provided in an embodiment of the application, and does not affect each other.

In embodiments of this application, user equipment refers to any device that can install a client of an application to provide a service related to the application for a user, for example, may be a device such as a mobile phone or a computer. A server refers to a device that can provide a corresponding service for an application or some applications on user equipment, for example, may be a network cloud engine (NCE) or a server. A network device refers to a device having a packet forwarding function, for example, may be a device such as a router, a switch, a forwarder, or a firewall. A controller refers to a device that has a management and control function for a first network or a module in the device. A network management device refers to a device or a module in the device that can manage a first network, a second network, or one application (or several applications). It should be noted that, in embodiments of this application, the controller and the network management device may be integrated into one physical device, or may be two independent physical devices. It should be noted that entity forms of various devices in embodiments of this application are not specifically limited in embodiments of this application.

For ease of understanding the packet processing method provided in an embodiment of the application, the following describes the method with reference to the accompanying drawings.

Figure 7:
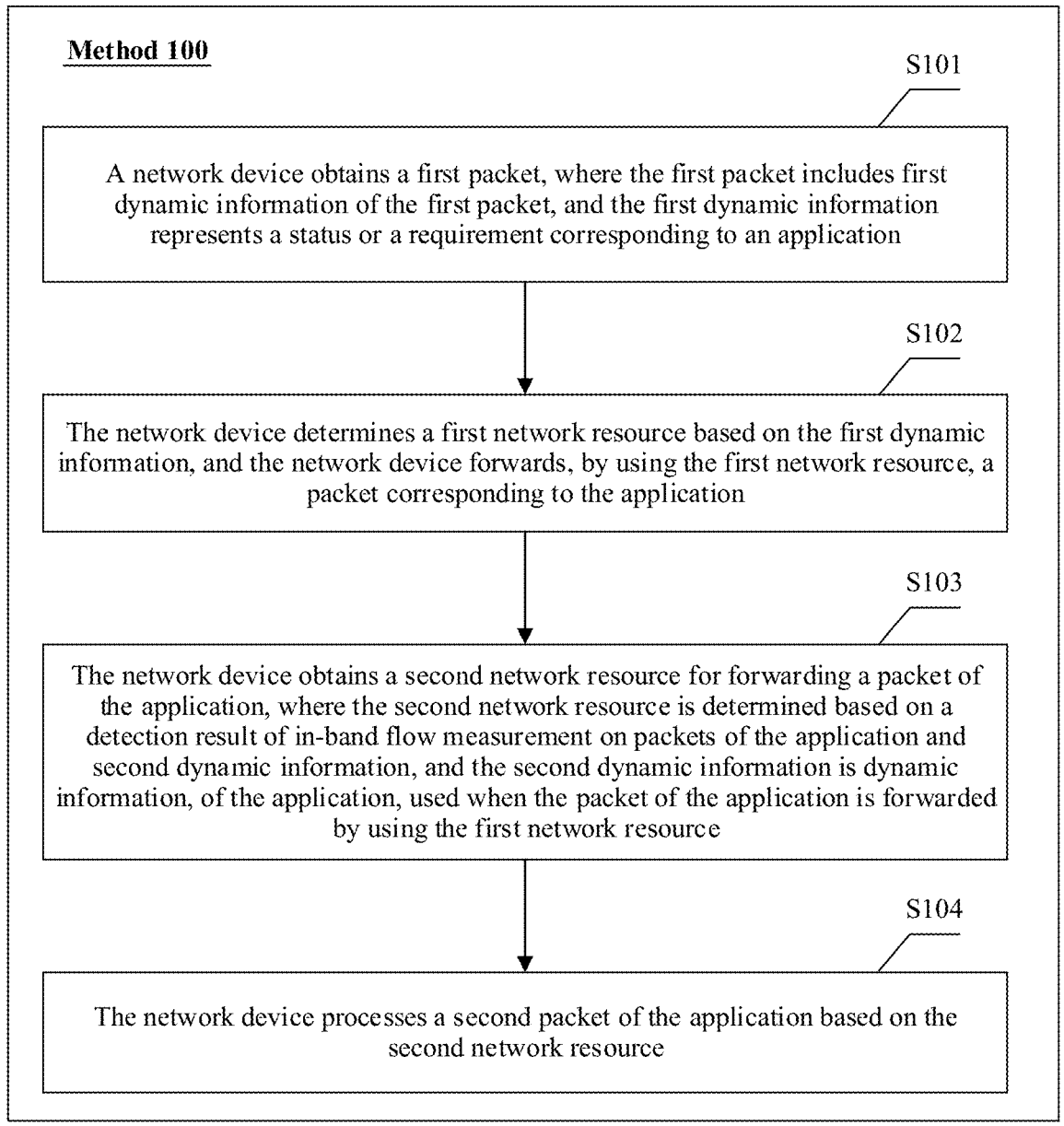
FIG. 7 is a schematic flowchart of a packet processing method 100 according to an embodiment of the application.

FIG. 7 is a schematic flowchart of a packet processing method 100 according to an embodiment of the application. In the method 100, a network device in a first network is used as an execution body for description. A structure of the scenario shown in FIG. 5 is used as an example. The first network may be, for example, the aggregation layer network 30 in FIG. 5, and the network device may be the network device 31 or the network device 34 in FIG. 6.

In an embodiment, the method 100 may include, for example, the following S101 to S104.

S101: A network device obtains a first packet, where the first packet includes first dynamic information of the first packet, and the first dynamic information represents a status or a requirement corresponding to an application.

S102: The network device determines a first network resource based on the first dynamic information, and the network device forwards, by using the first network resource, a packet corresponding to the application.

The first packet may be a data packet or a control packet.

The first packet may be a packet that is generated by user equipment, that needs to be sent to a server, and that corresponds to the application installed on the user equipment, or when a client that corresponds to the application and user equipment do not have a capability of generating dynamic information, the first dynamic information of the first packet may alternatively be generated by a broadband network gateway (BNG) or a customer premise equipment (CPE) connected to the user equipment. A destination address of the first packet matches an address of the server corresponding to the application. The first packet may be automatically generated by the application installed on the user equipment, or may be generated by triggering an operation performed by a user on the client corresponding to the application installed on the user equipment. In an embodiment, the network device in the first network receives the first packet sent by the user equipment, where the network device may be an ingress PE device in any network that a packet of the user equipment passes through on a path from the user equipment to the server, for example, may be the network device 31 in the aggregation layer network 30 in the scenario shown in FIG. 5. It should be noted that the BNG or the CPE generates, based on the packet sent by the user equipment, the first dynamic information corresponding to the packet, and carries the first dynamic information in the packet to obtain the first packet, so as to send the first packet to the network device. A process in which the BNG or the CPE generates the first dynamic information may include: The BNG or the CPE detects the received packet, and identifies a packet that belongs to a same flow as the packet; and then obtains a historical parameter of each received packet in the flow, and generates the first dynamic information of the flow based on the historical parameter via a technology such as machine learning, artificial intelligence (AI), or deep packet inspection ( ). That the BNG or the CPE detects the received packet, and identifies a packet that belongs to a same flow as the packet may be: The BNG or the CPE determines, based on application feature information carried in the received packet, the flow to which the packet belongs, and determines the packet that belongs to the flow.

Alternatively, the first packet may be a packet that is generated by a server, that needs to be sent to user equipment, and that corresponds to the application installed on the user equipment, or when a server corresponding to the application does not have a capability of generating dynamic information, the first dynamic information of the first packet may alternatively be generated by another network device that is between the server and the first network and has the capability of generating dynamic information. A destination address of the first packet matches an address of the user equipment corresponding to the application. The first packet may be independently generated by the server, or may be generated by responding to a packet sent by the user equipment. In an embodiment, the network device in the first network receives the first packet sent by the user equipment, where the network device may be an ingress PE device in any network that a packet of the server passes through on a path from the server to the user equipment, for example, may be the network device 34 in the aggregation layer network 30 in the scenario shown in FIG. 5.

The following uses an example in which the first packet is a packet sent by the user equipment to the network device for description.

The first packet received by the network device carries the first dynamic information. In this case, the network device may parse the first packet to obtain the first dynamic information carried in the first packet. The first dynamic information represents the related status or requirement of the application to which the first packet belongs, including the status of the application and a status of the user equipment in which the application is located. Dynamic information may be represented in two forms: a status value of an application or a status indication of an application. The status value of the application may be a value of a related parameter in an application running process. For example, the first dynamic information of the first packet may include remaining time of a buffered video of the application. The status indication of the application may be an indication determined based on the status value of the application, and indicates whether the network device that receives the first packet needs to provide an enhanced network resource or a backup network resource for the application. For example, the first dynamic information of the first packet may alternatively include a status indication (normal or alarm) corresponding to the remaining time of the buffered video of the application, where a normal state may represent that the enhanced or backup network resource does not need to be provided for the application, and an alarm state may represent that the enhanced or backup network resource needs to be provided for the application.

The enhanced network resource refers to a network resource that can provide a higher service requirement than a network resource used before enhancement. For example, a forwarding path 2 is an enhanced network resource of a forwarding path 1, and during forwarding of a same packet, a delay corresponding to the forwarding path 2 is less than a delay corresponding to the forwarding path 1. The backup network resource refers to a network resource that provides a same service requirement compared with a previously used network resource, and is used to implement packet distribution of an application when different users use the same application. For example, a forwarding path 2' is a backup network resource of a forwarding path 1'. If both a user 1 and a user 2 forward packets by using the forwarding path 1', a heavy load on the forwarding path 1' may cause a case in which a delay for the user 2 cannot meet a service requirement. In this case, the user 2 may perform switching to the backup network resource, namely, the forwarding path 2'. Therefore, even if a service requirement of the forwarding path 1' is the same as that of the forwarding path 2', because the load of the forwarding path 1' becomes lighter, the delay for the user 2 may meet the service requirement.

Figure 8A:
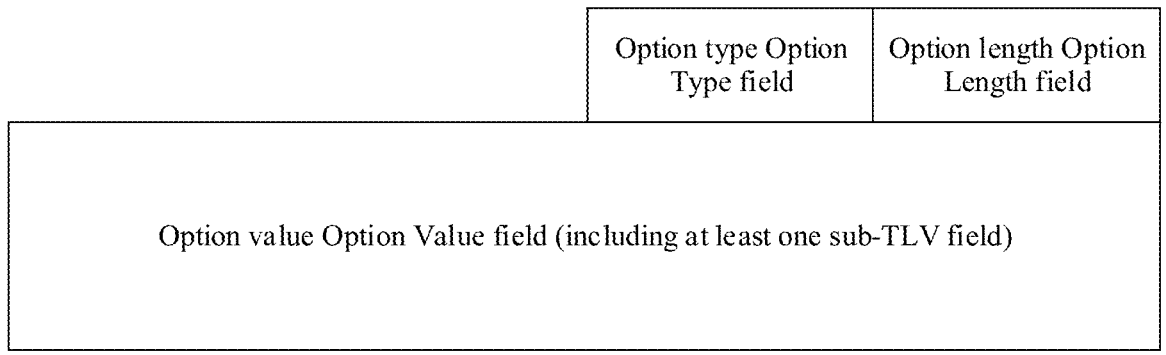
FIG. 8a is a schematic diagram of a format of a service status option field according to an embodiment of this application.

The first packet may carry the first dynamic information in a service status option field, and the Service Status Option field may be carried in an application-aware Internet Protocol version 6 networking (APN6) option header of the first packet. As shown in FIG. 8a, the Service Status Option field may include an Option Type field, an Option Length field, and an Option Value field. The Option Type field may be, for example, 1 byte, and a value of the Option Type field identifies that a type of the Option field is a Service-Status Option. The Option Length field may also be, for example, 1 byte, and a value of the Option Length field indicates a length occupied by the Option Value field. A length of the Option Value field is variable, and at least one piece of dynamic information may be carried in at least one sub-TLV field. For example, each sub-TLV field in the Option Value field carries one piece of dynamic information.

Figure 8B:
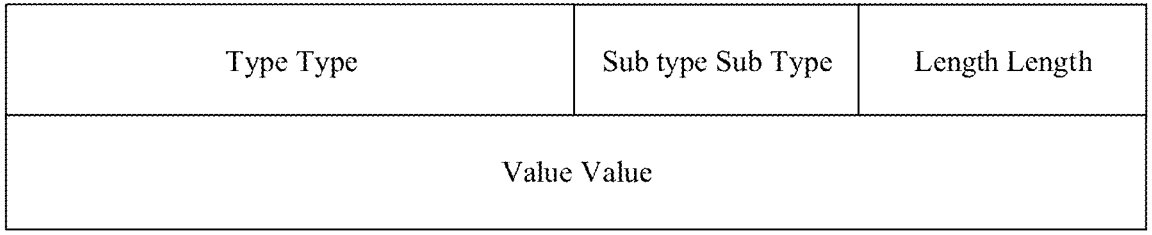
FIG. 8b is a schematic diagram of a format of a sub-TLV field in a service status option field according to an embodiment of this application.

As shown in FIG. 8b, each sub-TLV field in the Option Value field may include a Type field, a sub Type field, a Length field, and a Value field. The Type field may be, for example, 2 bytes, and indicates a category to which the piece of dynamic information belongs. The sub Type field may be, for example, 1 byte, and indicates a sub type of the piece of dynamic information in the category to which the piece of dynamic information belongs, and the sub Type field and the Type field jointly indicate a type of the piece of dynamic information. The Length field may be, for example, 1 byte, and indicates a length of the Value field. The length of the Value field is variable, and the Value field is used to carry content of the piece of dynamic information. For example, a classification manner of the dynamic information includes but is not limited to the following examples. A value of the Type field may be 0x0000 to 0x001F, indicating a general type, and a subtype represented by a value of the sub Type field may include: a delay, a variation, a bandwidth, and the like, where the general type may support 32*256=8192 types. Alternatively, a value of the Type field may be 0x0020 to 0x2020, indicating an application type such as a video application, and a subtype represented by a value of the sub Type field may include time of a buffered video and the like, where the application type may support 8192 types. Alternatively, a value of the Type field may be 0x2021 to 0xEFFF, indicating an application such as Honor of Kings, and a subtype represented by a value of the sub Type field may include an end-to-end delay, an air interface delay, and the like, where the application may support 53215 types. Alternatively, a value of the Type field may be 0xF000 to 0xFFFF, indicating a private application or an experimental purpose type such as an internal IT application of an enterprise or a research and development system, and a subtype represented by a value of the sub Type field may include a delay, a variation, a bandwidth, and the like, where the private application or the experimental purpose type may support 4096 types.

Figure 8C:
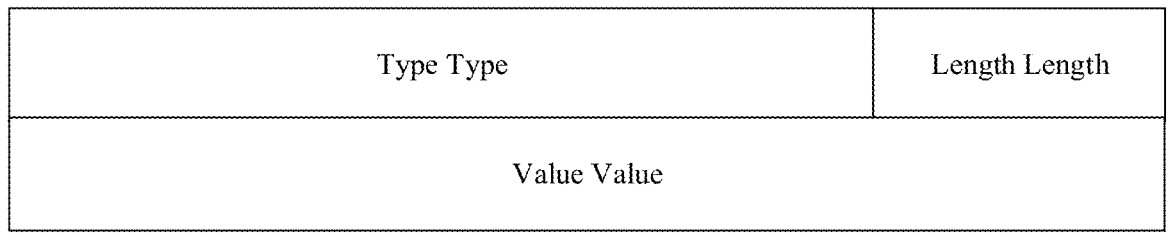
FIG. 8c is a schematic diagram of another format of a sub-TLV field in a service status option field according to an embodiment of this application.

Alternatively, as shown in FIG. 8c, each sub-TLV field in the Option Value field may include: a Type field, a Length field, and a Value field. The Type field may be, for example, three bytes. Compared with a format of the sub-TLV field shown in FIG. 8b, in FIG. 8c, only the Type field and the Sub Type field in the sub-TLV field shown in FIG. 8b are combined into one Type field. Compared with the format of the sub-TLV field shown in FIG. 8b, the network device may have better processing performance for the sub-TLV field shown in FIG. 8c.

For the sub-TLV field shown in FIG. 8b or FIG. 8c, the Value field carries the first dynamic information corresponding to the first packet.

In one case, if the first dynamic information is the status indication of the application, a format of the Value field may be, for example, as shown in FIG. 9a. The Value field may include a 1-bit E flag (indicating enhanced or early warning) and a 31-bit reserved field. For example, when the E flag=1, it may indicate that the application expects the first network to provide the enhanced network resource for the application, so as to avoid deterioration of QoE of the application; and when E flag=0, it may indicate that the application currently does not need the first network to provide the enhanced network resource for the application.

In an embodiment, if the first dynamic information is the status value of the application, formats of the Value field may vary with different first dynamic information. For example, for first dynamic information with a video attribute, a format of the Value field may be shown in FIG. 9b, and the Value field includes a reserved field, a resolution level, and a video bitrate (also referred to as a bit rate, Mbps). For another example, for the remaining time of the buffered video, a format of the Value field may be shown in FIG. 9c, and the Value field includes a reserved field and the remaining time of the buffered video, where a unit of the remaining time of the buffered video is millisecond (, ms). For still another example, for a remaining size of the buffered video, a format of the Value field may be shown in FIG. 9d, and the Value field includes a reserved field and the remaining size of the buffered video, where a unit of the remaining size of the buffered video is kilobyte (KB). For yet another example, for a ratio of a remaining size of the buffered video to buffer space, a format of the Value field may be shown in FIG. 9e, and the Value field includes a reserved field and the ratio of the remaining size of the buffered video to the buffer space. For still another example, for an end-to-end delay from the user equipment to a service device, a format of the Value field may be shown in FIG. 9f, and the Value field includes a reserved field and the end-to-end delay (which may also be referred to as round trip time (RTT), unit: microsecond ($\mu$s). For yet another example, for an end-to-end delay variation from the user equipment to a service device, a format of the Value field may be shown in FIG. 9g, and the Value field includes a reserved field and the end-to-end delay variation (which may also be referred to as an RTT, unit: $\mu$s). For yet another example, for an end-to-end rate from the user equipment to a service device, a format of the Value field may be shown in FIG. 9h, and the Value field includes a T field, a D field, a reserved field, and an end-to-end rate. A value of the T field may represent a unit of the end-to-end rate. For example, 0 represents kilobits per second (Kbps), 1 represents Mbps, and 2 represents gigabits per second (Gbps). A value of the D field may represent whether the end-to-end rate is an uplink rate or a downlink rate. For example, 0 represents that the end-to-end rate is an uplink rate, and 1 represents that the end-to-end rate is a downlink rate.

In embodiments of this application, a network resource includes one or more of the following information: a quality of service class, a forwarding path, a bandwidth, a network slice, a radio channel, or a radio frequency. The quality of service class may be, for example, a quality of service (QoS) level or an SLA level. When the network resource is information such as a quality of service class or a network slice, all network devices in the first network need to be notified of a network resource used in the first network. When the network resource is information such as a forwarding path or a bandwidth, only a head node (namely, the network device in S101) in the first network needs to know a network resource used in the first network.

In an example, when receiving the first packet, the network device may forward the packet of the application by using the first network resource, or may forward a packet of the application by using a third network resource, where a service requirement provided by the first network resource for the application is higher than a service requirement provided by the third network resource for the application, or the first network resource is a backup network resource of the third network resource (in other words, a service requirement provided by the first network resource for the application is the same as a service requirement provided by the third network resource for the application). When the network device receives the first packet, if the network device forwards the packet of the application by using the third network resource, before S102, for example, the method 100 may further include: The network device determines, based on the first dynamic information in the first packet, that the third network resource provided by the first network for the application cannot meet a service requirement of the application.

The network device may be a PE device that is connected to the first network and that is of the client or server of the application. If the first packet is received by the network device from a user equipment side on which the application is installed, the network device may be a PE device that is connected to the first network and that is of the user equipment on which the client of the application is located, for example, the network device 31 of the aggregation layer network 30. If the first packet is received by the network device from a server side corresponding to the application, the network device is a PE device that is connected to the first network and that is of the server of the application, for example, the network device 34 of the aggregation layer network 30. It should be noted that, the network device may alternatively be another device that is connected to the PE device in the first network and that belongs to the first network, provided that the network device can implement the functions provided in embodiments of this application. The network device is not specifically limited in embodiments of this application.

The service requirement of the application may be determined based on at least one of the following information: a threshold of the dynamic information, application feature information, or application requirement information, where the application feature information represents an attribute of the application, the application requirement information represents a requirement of the application for a second network, and the second network is a network using the client of the application and the server of the application as boundaries. The second network includes the first network. For example, in the scenario shown in FIG. 5, the second network may include, for example, the user equipment 11, the user equipment 12, the access layer network 20, the aggregation layer network 30, and the data center network 40.

In an example, regardless of whether the application is in an abnormal state or a normal state, the first packet carries the first dynamic information. In this case, for S101a, after receiving the first packet, the network device may determine, based on the first dynamic information, whether the third network resource currently provided in the first network for the application can meet the service requirement of the application. In one case, the network device may determine, based on the first dynamic information, whether the third network resource can meet the service requirement of the application. In an embodiment, the network device may determine, based on the first dynamic information and the application feature information, whether the third network resource can meet the service requirement of the application. In an embodiment, the network device may determine, based on the first dynamic information, the application feature information, and the application requirement information, whether the third network resource can meet the service requirement of the application. When a network to which the network device belongs transmits a packet of a same type of application, the network device may determine, based only on the first dynamic information of the application, whether the third network resource can meet the service requirement of the application, or determine, based on the first dynamic information of the application and the application requirement information, whether the third network resource can meet the service requirement of the application. When packets transmitted in the network are related to a plurality of applications, the network device may determine, based on the first dynamic information and the application feature information, whether the third network resource can meet the service requirement of the application, or may determine, based on the first dynamic information, the application feature information, and the application requirement information, whether the third network resource can meet the service requirement of the application. If the first dynamic information is the status value of the application, the network device may store a corresponding threshold, where the threshold corresponds to a critical value that meets the service requirement of the application. For example, S101a may include: The network device compares the status value of the application with the threshold, and determines whether the third network resource corresponding to the first packet meets the service requirement of the application. The threshold may be a fixed value that is statically or dynamically configured in advance on the network device, or may be a variable value that is continuously adjusted and updated in a running process of the network device, or may be generated via a technology such as machine learning, big data, or AI.

In an embodiment, only when the application is in an abnormal state, it is considered that the first dynamic information needs to be notified to the network device. Therefore, if the first packet received by the network device carries the first dynamic information, it may be determined that the application is currently in an abnormal state; otherwise, if the first packet received by the network device does not carry the first dynamic information, it may be determined that the application is currently in a normal state. In this case, for S101a, after receiving the first packet, the network device may determine, depending on whether the first packet carries the first dynamic information, whether the third network resource currently provided in the first network for the application can meet the service requirement of the application. In one case, if the first packet carries the first dynamic information, it may be determined that the third network resource cannot meet the service requirement of the application. In the other case, if the first packet does not carry the first dynamic information, it may be determined that the third network resource can meet the service requirement of the application.

In an embodiment, the first packet received by the network device may further carry indication information, where the indication information indicates to perform enhancement or backup switchover on the network resource of the application. The indication information may be generated and added to the first packet when the user equipment (or another device between the user equipment and the network device) determines that the third network resource currently provided in the first network for the application cannot meet the service requirement of the application. In this case, for example, S101a may be: After receiving the first packet, the network device may determine, based on the indication information carried in the first packet, that the third network resource currently provided in the first network for the application cannot meet the service requirement of the application. Alternatively, for example, S101a may be: After receiving the first packet, the network device may determine, based on content of the indication information carried in the first packet, that the third network resource currently provided in the first network for the application cannot meet the service requirement of the application. The indication information may be carried in a sub-TLV field of the Service Status Option field in the APN6 option header of the first packet. In one case, for a format of the sub-TLV field that carries the indication information, refer to FIG. 8b or FIG. 8c. The Type field or the Sub Type field in FIG. 8b carries the indication information, or the Type field in FIG. 8c carries the indication information. In an embodiment, the indication information may alternatively be carried in an extended I flag of a Value field of the sub-TLV field. It should be noted that the sub-TLV field that carries the indication information and the sub-TLV field that carries the first dynamic information may be the same or may be different. If the sub-TLV fields are the same, a format of the sub-TLV field may be shown in FIG. 9a, and the Value field of the sub-TLV field not only includes the E flag, but also includes the I flag. When the I flag=1, it indicates that the third network resource cannot meet the service requirement of the application; and when the I flag=0, it indicates that the third network resource can meet the service requirement of the application.

If the network device determines that the third network resource can meet the service requirement of the application, the network device continues to use the third network resource in the first network to provide a service for the application, and the method 100 may not be performed. If the network device determines that the third network resource cannot meet the service requirement of the application, S101b is performed, for example, the network device may determine the enhanced network resource, namely, the first network resource, for the application in the first network, where the service requirement provided by the first network resource for the application is higher than the service requirement provided by the third network resource for the application, or the network device may determine the backup network resource, namely, the first network resource, for the application, where the service requirement provided by the first network resource is the application is the same as the service requirement provided by the third network resource for the application. In this way, for a case in which the status of the application is poor because the third network resource used in the first network provides a service for the application, the first network provides the first network resource for the application, so that a status of the application meets the service requirement of the application.

For example, the first network is the aggregation layer network 30 shown in FIG. 5, and the network device is the network device 31. When the network device 31 receives the first packet, the aggregation layer network 30 forwards, by using a forwarding path 1, a received packet that belongs to the application, and the service requirement is that a delay is less than 50 milliseconds. In a case, if the first dynamic information carried in the first packet indicates that a current delay of the application is 30 milliseconds, the network device 31 may determine that the forwarding path 1 can meet the service requirement of the application, and the network device 31 forwards, on the forwarding path 1, the received packet (including the first packet) that belongs to the application. In an embodiment, if the first dynamic information carried in the first packet indicates that a current delay of the application is 80 milliseconds, the network device 31 may determine that the forwarding path 1 cannot meet the service requirement of the application. In this case, the network device 31 determines an enhanced network resource or a backup network resource, namely, a forwarding path 2, for the application in the aggregation layer network 30, so as to forward, on the forwarding path 2, the received packet (including the first packet) that belongs to the application.

When the first packet corresponds to a plurality of pieces of first dynamic information, and the plurality of pieces of first dynamic information correspond to different types of network resources on the network device, the network device may determine a network resource of a corresponding type based on each piece of first dynamic information, so as to process the first packet based on a plurality of network resources that are determined. Alternatively, when the first packet corresponds to a plurality of pieces of first dynamic information, but at least two of the plurality of pieces of first dynamic information correspond to a same type of network resource on the network device, the network device may respectively determine corresponding network resources based on the at least two pieces of first dynamic information, determine, according to a preset rule (for example, by selecting a better processing manner), one network resource corresponding to the at least two pieces of first dynamic information, and process the first packet based on the determined network resource. In an embodiment of the application, an example of one piece of first dynamic information in the first packet and one corresponding type of network resource is used for description.

When determining to use the first network resource for the application in the first network, the network device may further perform in-band flow measurement for the application in the first network, to learn whether the first network resource used in the first network can effectively meet the service requirement of the application. In-band flow measurement may include but is not limited to iOAM or iFIT.

In an example, the network device may determine, based on the first dynamic information in the first packet, to perform in-band flow measurement for the application, to obtain a detection result. For example, when determining that the first dynamic information in the first packet indicates that the current status of the application does not meet the service requirement of the application, the network device enables in-band flow measurement for the application.

In an embodiment, the network device may determine, based on indication information in the first packet, to perform in-band flow measurement for the application, to obtain the detection result. In one case, the indication information may be the indication information "indicating to perform enhancement or backup switchover on the network resource of the application" mentioned above, in other words, the indication information in the first packet indicates to perform enhancement or backup switchover on the network resource of the application, and further indicates to perform in-band flow measurement for the application. In an embodiment, the indication information may be another piece of indication information different from the indication information "indicating to perform enhancement or backup switchover on the network resource of the application" mentioned above. For example, the first packet may include indication information A and indication information B, where the indication information A indicates to perform enhancement or backup switchover on the network resource of the application, and the indication information B indicates to perform in-band flow measurement for the application. For a manner of carrying the indication information B in the first packet, refer to the foregoing descriptions of a carrying manner of the indication information A (namely, the indication information "indicating to perform enhancement or backup switchover on the network resource of the application"). For example, when determining that the indication information in the first packet indicates that the current status of the application does not meet the service requirement of the application, or when determining that the indication information in the first packet indicates to perform in-band flow measurement for the application, the network device enables in-band flow measurement for the application.

In-band flow measurement may include two modes. Mode 1: Each device in the first network separately sends detection information of in-band flow measurement by the device to a target device, and the target device determines a detection result of the first network based on the received detection information. Mode 2: Each device in the first network appends detection information of in-band flow measurement by the device to received detection information accumulated by a previous device, and sends latest detection information backwards, until a tail node in the first network appends detection information of the tail node to the received detection information, to obtain final detection information. The tail node sends the final detection information to a target device, and the target device determines a detection result of the first network based on the received final detection information, where the tail node may be the target device. The target device may be a controller corresponding to the first network, or may be any device in the first network. This is not specifically limited in embodiments of this application.

Figure 10A:
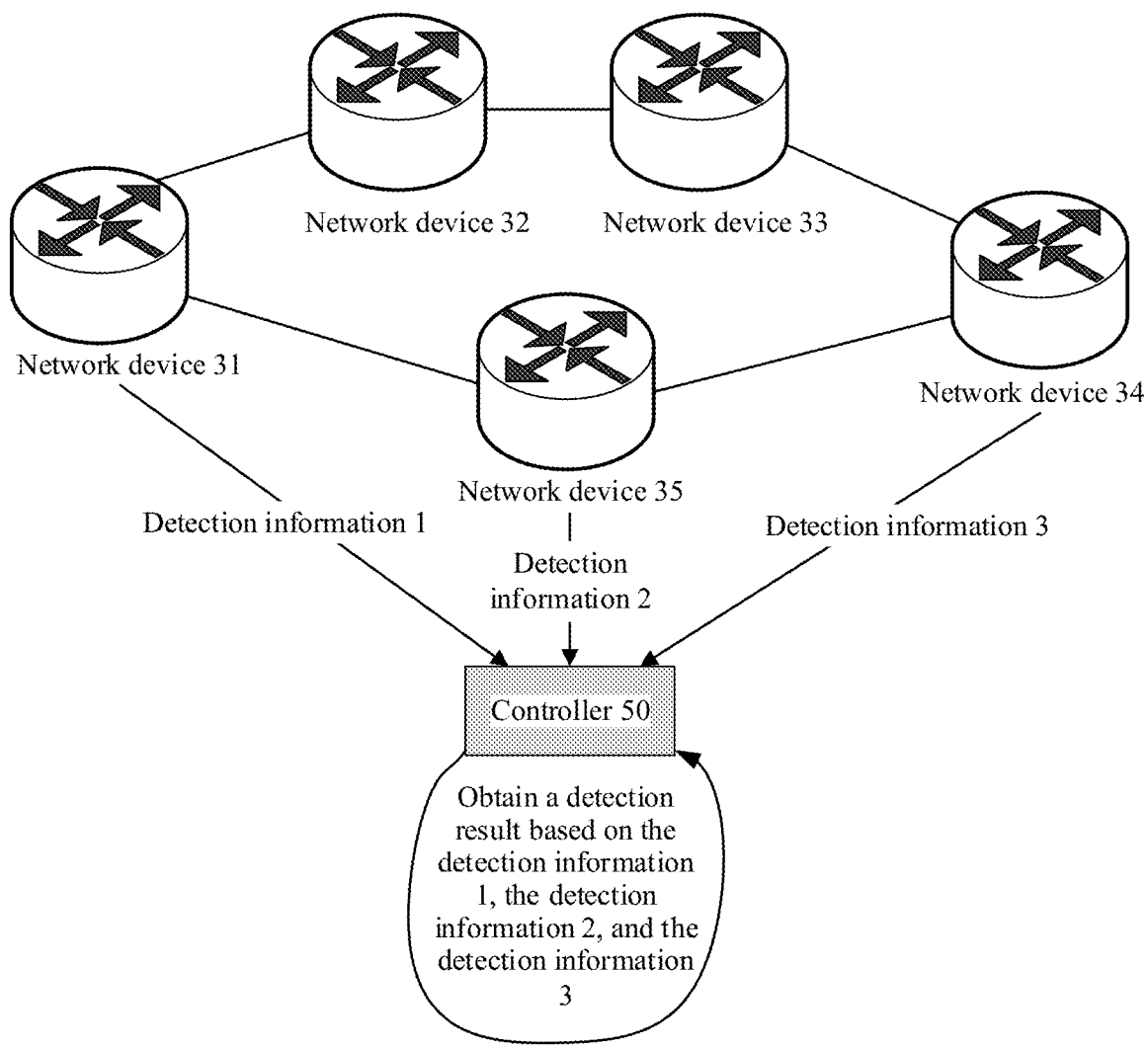
FIG. 10a is a schematic diagram of an in-band flow measurement process according to an embodiment of this application.

For example, in the aggregation layer network 30 shown in FIG. 6, it is assumed that the first network resource of the aggregation layer network 30 includes the forwarding path 2, the network device 31 enables in-band flow measurement and uses Mode 1, and the target device is the controller 50. In this case, refer to FIG. 10a. A process of in-band flow measurement may include: First, the network device 31, the network device 35, and the network device 34 separately perform in-band flow measurement to obtain detection information 1, detection information 2, and detection information 3. Then, the network device 31 sends the detection information 1 to the controller 50, the network device 35 sends the detection information 2 to the controller 50, and the network device 34 sends the detection information 3 to the controller 50. Then, the controller 50 obtains a detection result based on the detection information 1, the detection information 2, and the detection information 3.

Figure 10B:
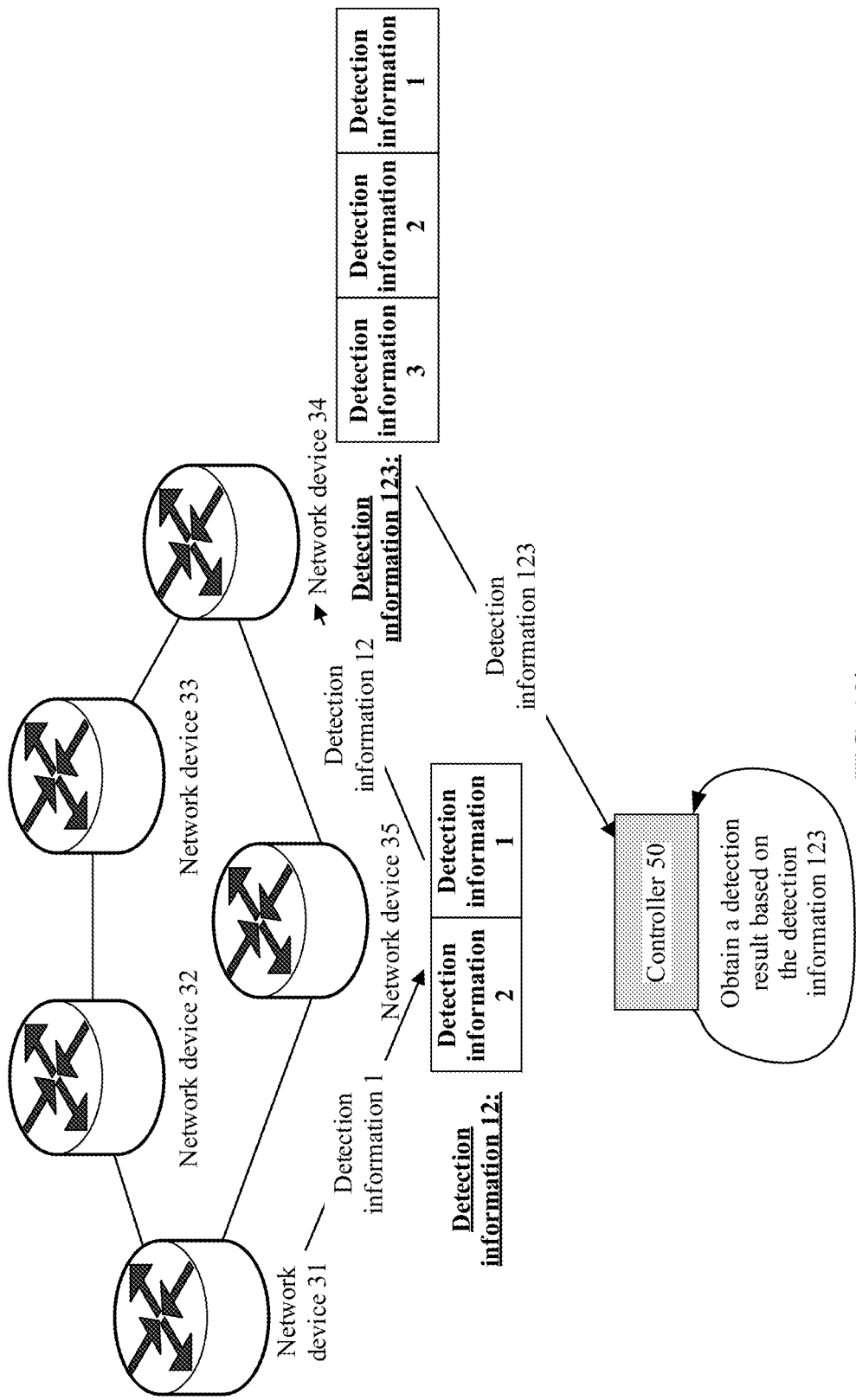
FIG. 10b is a schematic diagram of another in-band flow measurement process according to an embodiment of this application.

For another example, the aggregation layer network 30 shown in FIG. 6 is still used as an example, and it is assumed that the first network resource of the aggregation layer network 30 includes the forwarding path 2, the network device 31 enables in-band flow measurement and uses Mode 2, and the target device is the controller 50. In this case, refer to FIG. 10*b*. A process of in-band flow measurement may include: First, the network device 31 performs in-band flow measurement to obtain detection information 1, and sends the detection information 1 to the network device 35. Then, the network device 35 performs in-band flow measurement to obtain detection information 2, appends the detection information 2 to the detection information 1, to obtain detection information 12, and sends the detection information 12 to the network device 34. Subsequently, the network device 34 performs in-band flow measurement to obtain detection information 3, appends the detection information 3 to the detection information 12 to obtain detection information 123, and sends the detection information 123 to the controller 50. Therefore, the controller 50 obtains a detection result based on the detection information 123.

The detection result of in-band flow measurement may be determined by the target device (for example, the controller) based on the detection information. For example, the target device may obtain the detection result by averaging or summing up the detection information. For example, an indicator of in-band flow measurement is a delay. If the detection information 1, the detection information 2, and the detection information 3 may be, for example, 20 milliseconds, 30 milliseconds, and 40 milliseconds respectively, the detection result may be (20 milliseconds+30 milliseconds+ 40 milliseconds)=90 milliseconds; or the detection result may be (20 milliseconds+30 milliseconds+40 milliseconds)/ 3=30 milliseconds.

S103: The network device obtains a second network resource for forwarding a packet of the application, where the second network resource is determined based on the detection result of in-band flow measurement on packets of the application and second dynamic information, and the second dynamic information is dynamic information, of the application, used when the packet of the application is forwarded by using the first network resource.

In an example, the network device may determine a proper network resource, namely, the second network resource, based on the detection result of in-band flow measurement on the packets of the application, the service requirement of the application, and the second dynamic information, of the application, used when the packet of the application is forwarded by using the first network resource. For the detection result, in one case, the network device is the target device, and the network device may obtain the detection result based on the detection information. In an embodiment, the network device is not the target device, and the network device may receive the detection result sent by the target device. The service requirement of the application may be determined by the network device based on at least one of the following information: the threshold corresponding to the dynamic information, the application feature information, or the application requirement information. The second dynamic information reflects the status of the application after the first network resource is used in the first network. After S102, in a process in which the network device forwards the packet of the application by using the first network resource in the first network, the network device may obtain the second dynamic information from the packet of the application. For example, after S102, the network device receives a third packet of the application after using the first network resource in the first network, and the network device obtains the second dynamic information from the third packet.

In an embodiment, another device (for example, the controller) may alternatively determine the second network resource based on the detection result of in-band flow measurement for the application in the first network, the service requirement of the application, and the second dynamic information of the application in the first network resource, and send the second network resource to the network device. For example, the controller determines the second network resource and sends the second network resource to the network device. For the detection result, in one case, the controller is the target device, and the controller may obtain the detection result based on the detection information. In an embodiment, the controller is not the target device, and the controller may receive the detection result sent by the target device. The service requirement of the application may be determined by the controller based on at least one of the following information: the threshold corresponding to the dynamic information of the application, the application feature information, or the application requirement information. The second dynamic information of the application in the first network resource reflects the status of the application after the first network resource is used in the first network. After S102, in a process in which the network device processes the packet of the application by using the first network resource in the first network, the network device may obtain the second dynamic information from the packet of the application, and send the second dynamic information to the controller. For example, after S102, the network device receives a third packet of the application after using the first network resource in the first network. The network device obtains the second dynamic information from the third packet, and sends the second dynamic information in the third packet to the controller.

In an embodiment, if the detection result of in-band flow measurement of the application in the first network and the second dynamic information meet a preset first condition, the second network resource obtained by the network device is the same as the first network resource.

In an example, the preset first condition may include: The detection result meets the service requirement of the application, and the dynamic information of the application indicates that a status of the application is better (or may be referred to as improved) or the requirement of the application is met. It may be understood that, when the first condition is met, it indicates that the first network resource used in the first network is effective to ensure that the status of the application meets the service requirement of the application, and QoE deterioration can be effectively avoided. For example, the scenario shown in FIG. 5 is used as an example. It is assumed that the first network resource used in the first network is a forwarding path 2 in the aggregation layer network 30, the service requirement of the application includes that a delay is less than 50 milliseconds, the detection result of in-band flow measurement is 30 milliseconds, and a delay included in dynamic information of the application after the forwarding path 2 is enabled is 35 milliseconds. In this case, it may be determined that the detection result meets the service requirement of the application (that is, 30 ms is less than 50 ms), and the dynamic information of the application indicates that a status of the application is better (that is, 35 ms is less than 50 ms or 35 ms is less than a corresponding threshold), so that it is determined that the forwarding path 2 in the aggregation layer network 30 effectively avoids QoE deterioration. Therefore, the network device 31 keeps using the forwarding path 2 in the aggregation layer network 30 to process a packet of the application.

In an embodiment, the preset first condition may alternatively include: The detection result does not meet the service requirement of the application. It may be understood that, when the first condition is met, it indicates that after the first network resource is used in the first network, transmission quality in the first network for the application still cannot meet the service requirement. Therefore, it is determined that the first network does not have a capability of providing a service meeting the service requirement for the application, and has a risk of breach of contract. In this way, in one case, to reduce overheads caused by network resource switching, the network resource used in the first network may not be changed, in other words, the first network resource is still used. In an embodiment, to avoid abuse of a network resource, the network resource may be degraded in the first network, and another network resource whose provided service requirement is lower than that of the first network resource is used for providing a service for the application. In this example, the network device may further generate and send alarm information to a network management device, to notify the network management device that the first network does not have a service capability of providing the corresponding service requirement for the application. The network management device may be any device having a management and control function for the first network. For example, the network management device may be the controller.

In this example, the network device, the controller, or the network management device may further re-plan a new network resource (for example, recalculate a forwarding path) for the application in the first network, and design a proper network resource that can meet the service requirement of the application, to overcome a problem that the current first network "does not have a capability of providing a service meeting the service requirement for the application, and has a risk of breach of contract", so that the network device uses the newly planned network resource for the application in the first network.

For example, in the scenario shown in FIG. 5, it is assumed that the first network resource used by the first network is a forwarding path 2 in the aggregation layer network 30, the service requirement of the application includes that a delay is less than 50 milliseconds, and the detection result of in-band flow measurement is 80 milliseconds. In this case, it may be determined that the detection result does not meet the service requirement of the application (that is, 80 ms is not less than 50 ms). In this case, it is determined that the aggregation layer network 30 does not have a service capability of providing the corresponding service requirement for the application. Therefore, the network device 31 may send the alarm information to the controller 50, to notify the controller 50 that the aggregation layer network 30 has a risk of breach of contract, and the network device 31 keeps using the forwarding path 2 to process a packet of the application. In addition, the controller 50 may further calculate a forwarding path 3 as a better network resource in the aggregation layer network 30, where the forwarding path 3 is a path that sequentially passes through the network device 31, the network device 35, the network device 33, and the network device 34, and the controller 50 sends the forwarding path 3 to the network device 31 as a fourth network resource, to indicate the network device 31 to process a packet of the application in the aggregation layer network 30 by using the forwarding path 3, so that the aggregation layer network 30 has the service capability of providing the corresponding service requirement for the application, to overcome the risk of breach of contract.

In an embodiment, if the detection result of in-band flow measurement of the application in the first network, the service requirement of the application, and the dynamic information of the application in the first network resource meet a preset second condition, the second network resource obtained by the network device is different from the first network resource, where a service requirement provided by the second network resource for the application is lower than the service requirement provided by the first network resource for the application, or the second network resource is a backup network resource of the first network resource.

In an example, the preset second condition may include: The detection result meets the service requirement of the application, but the dynamic information of the application indicates that the status of the application is not better. It may be understood that, when the second condition is met, it indicates that, when the first network resource is used in the first network, although transmission quality of the packet of the application in the first network can meet the service requirement of the application, it is invalid to ensure that the status of the application meets the service requirement of the application, and QoE deterioration cannot be effectively avoided. In this example, it can be determined that poor QoE of the application is not caused by the first network, and a cause of QoE deterioration may include but is not limited to: a problem of an upstream network and a downstream network of the first network, and/or a disadvantage of the application (where for example, the application intends to occupy an enhanced network resource or a backup network resource by carrying untrue dynamic information in a packet). In this case, to ensure properness of a network resource, the network device may cancel use of the first network resource in the first network or degrade the currently used first network resource, for example, use the third network resource in the first network or use a network resource whose service requirement is lower than that provided by the third network resource.

In an embodiment, to prevent the network device from using the first network resource for the application again in the first network in short time, frozen time may be further set, and the first network resource is no longer used for the application in the first network in the frozen time. In this way, a problem that a processing resource is wasted because of continuous invalid network resource adjustment can be resolved, and abuse and misuse of a network resource can be avoided.

For example, the scenario shown in FIG. 5 is used as an example. It is assumed that the first network resource used in the first network is a forwarding path 2 in the aggregation layer network 30, the service requirement of the application includes that a delay is less than 50 milliseconds, the detection result of in-band flow measurement is 30 milliseconds, and a delay included in dynamic information of the application after the forwarding path 2 is enabled is 80 milliseconds. In this case, it may be determined that the detection result meets the service requirement of the application (that is, 30 ms is less than 50 ms). However, the dynamic information of the application indicates that the status of the application is not improved (that is, 80 ms is not less than 50 ms or 80 ms is not less than a corresponding threshold). In this case, it is determined that the forwarding path 2 in the aggregation layer network 30 is invalid for avoiding QoE deterioration. Therefore, to ensure properness of a network resource, the network device 31 degrades the network resource in the aggregation layer network 30, and enables the third network resource, namely, the forwarding path 1, for the application. In an embodiment, to prevent the network device 31 from using the forwarding path 2 for the application again in the aggregation layer network 30 in short time, the frozen time may be further set to 10 minutes, that is, the forwarding path 2 is no longer used for the application in the aggregation layer network 30 within 10 minutes.

In this way, after the enhanced or backup first network resource is used for the application in the first network, after S102, it is evaluated, based on the dynamic information of the application and the detection result of in-band flow measurement, whether the first network resource used in the first network can effectively improve actual transmission quality of the packet of the application in the first network, and whether the first network resource used in the first network can improve the status of the application, so that a more proper second network resource is determined for the first network based on an evaluation result, to improve properness of the network resource used in the first network.

S104: The network device processes a second packet of the application based on the second network resource.

In an embodiment, after S103, the network device enables the second network resource for the application in the first network, and at the same time, the network device processes, based on the second network resource, all received packets (including the second packet) that belong to the application. For example, if the second network resource is the forwarding path 2 shown in FIG. 6, corresponding to S104, the network device 31 sends the second packet on the forwarding path 2. For another example, if the second network resource is the forwarding path 1 shown in FIG. 6, corresponding to S104, the network device 31 sends the second packet on the forwarding path 1.

In this way, in the method 100, a more proper network resource can be determined for the first network based on the dynamic information of the application and the detection result of in-band flow measurement in a network domain, so that the network resource can be properly and effectively provided for the application in the network domain (namely, the first network), to ensure that the application brings good QoE to the user. For example, the network device can determine, based on the dynamic information of the application and the detection result of in-band flow measurement in the network domain, whether the network domain causes a poor status of the application, and determine whether the enhanced or backup network resource used in the network domain is proper (for example, whether the transmission quality that is in the network domain for the application after the first network resource is used meets the service requirement of the application, and/or whether the status of the application is effectively improved after the first network resource is used), to adaptively and properly plan the network resource used in the network domain.

Figure 11:
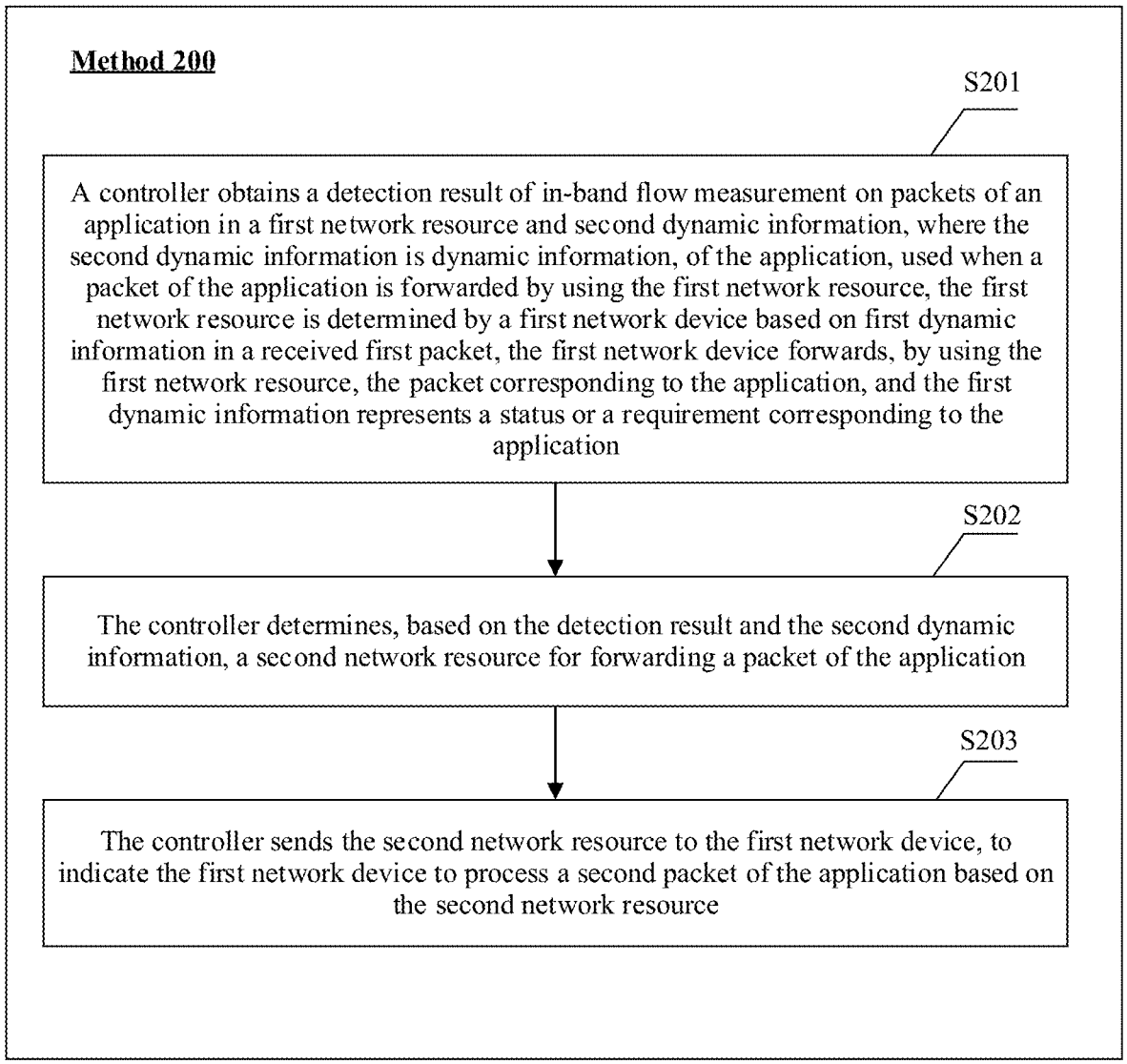
FIG. 11 is a schematic flowchart of a packet processing method 200 according to an embodiment of this application.

In a scenario in which a controller is included and the controller participates in determining a network resource for an application in a first network, an embodiment of this application may further provide a packet processing method 200 as shown in FIG. 11. In the method 200, the controller is used as an execution body for description. A structure of the scenario shown in FIG. 5 is used as an example. The first network may be, for example, the aggregation layer network 30 in FIG. 5, and the controller may be the controller 50 in FIG. 5.

In an embodiment, the method 200 may include, for example, the following S201 to S203.

S201: The controller obtains a detection result of in-band flow measurement on packets of an application in a first network resource and second dynamic information, where the second dynamic information is dynamic information, of the application, used when a packet of the application is forwarded by using the first network resource, the first network resource is determined by a first network device based on first dynamic information in a received first packet, the first network device forwards, by using the first network resource, the packet corresponding to the application, and the first dynamic information represents a status or a requirement corresponding to the application.

For the first network device, the first network resource, the second dynamic information, in-band flow measurement, the detection result, the first dynamic information, and the first packet, refer to related descriptions of the first network device, the first network resource, the second dynamic information, in-band flow measurement, the detection result, the first dynamic information, and the first packet in the method 100.

For the detection result, in one case, the controller may determine the detection result based on detection information received from each network device in the first network. an embodiment, the controller may alternatively receive detection information sent by a third network device (for example, an egress node of the application in the first network), where the detection information includes detection information of in-band flow measurement by each network device in the first network, so that the controller determines the detection result based on the received detection information. In an embodiment, the controller may alternatively receive the detection result sent by a second network device. The second network device may be, for example, any network device in the first network. The second network device has a capability of determining the detection result based on detection information of in-band flow measurement for the application in the first network resource in the first network.

A service requirement of the application may be determined by the controller based on at least one of the following information: a threshold corresponding to the dynamic information of the application, application feature information, or application requirement information, or may be obtained by the controller from the first network, a second network, or a provider of the application.

The second dynamic information of the application in the first network resource reflects a status or a requirement that is of the application and that exists after the first network resource is used in the first network, and may be dynamic information obtained from the packet of the application and sent to the controller in a process in which the network device processes the packet of the application in the first network by using the first network resource.

In this way, the controller obtains the detection result of in-band flow measurement for the application in the first network, the service requirement of the application, and the dynamic information of the application in the first network resource after the enhanced or backup first network resource is used for the application in the first network, and the obtained information provides a data basis for properly planning a network resource for the application in the first network.

S202: The controller determines, based on the detection result and the second dynamic information, a second network resource for forwarding a packet of the application.

It should be noted that, for an implementation and a technical effect of S202, refer to related descriptions of determining the second network resource by the controller in S103.

S203: The controller sends the second network resource to the first network device, to indicate the first network device to process a second packet of the application based on the second network resource.

In an embodiment, after S202, to enable a more proper second network resource for the application in the first network, the controller may send the second network resource to the first network device, to indicate the first network device to process, based on the second network resource, all received packets that belong to the application. For example, if the second network resource is the forwarding path 2 shown in FIG. 6, corresponding to S203, the controller may send the forwarding path 2 to the network device 31, to indicate the network device 31 to send, on the forwarding path 2, a subsequently received packet that belongs to the application. For another example, if the second network resource is the forwarding path 1 shown in FIG. 6, corresponding to S203, the controller may send the forwarding path 1 to the network device 31, to indicate the network device 31 to send, on the forwarding path 1, a subsequently received packet that belongs to the application.

It should be noted that, when the controller sends the second network resource to the first network device, the controller may send the second network resource or indication information corresponding to the second network resource to the first network device. It may be considered that the controller sends the "second network resource" to the first network device provided that the first network device can be indicated to enable the second network resource in the first network.

In an embodiment, some network resources such as a quality of service class and a network slice not only need to be known by a PE device in the first network, but also need to be notified to each network device in the first network. Therefore, an embodiment of the application may further include: The controller sends the second network resource to each network device in the first network, to indicate to process the packet of the application based on the second network resource.

In this way, in the method 200, the controller can determine a more proper network resource for the first network based on the dynamic information of the application and the detection result of in-band flow measurement in a network domain, and send the planned network resource to the network device in the network domain, so that the network resource can be properly and effectively provided for the application in the network domain (namely, the first network), to ensure that the application brings good QoE to a user. For example, the network device can determine, based on the dynamic information of the application and the detection result of in-band flow measurement in the network domain, whether the network domain causes a poor status of the application, and determine whether the enhanced or backup network resource used in the network domain is proper (for example, whether transmission quality that is in the network domain for the application after the first network resource is used meets the service requirement of the application, and/or whether a status of the application is effectively improved after the first network resource is used), to adaptively and properly plan the network resource used in the network domain.

Figure 12:
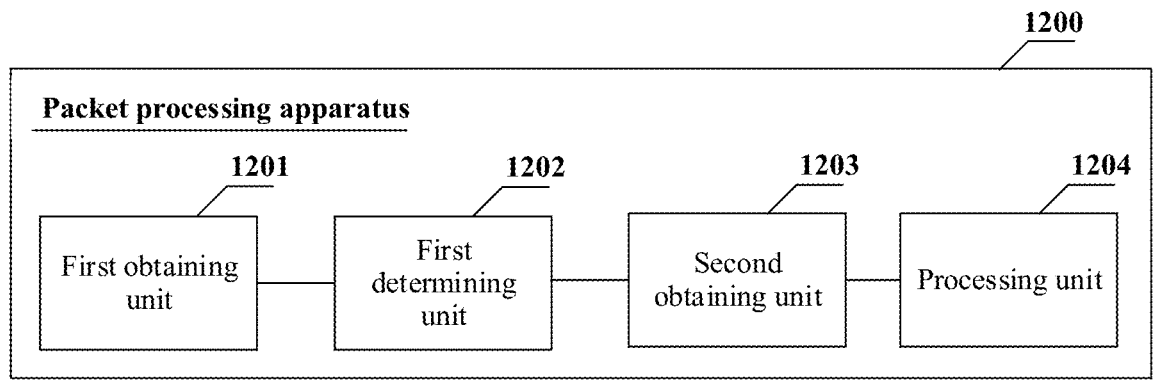
FIG. 12 is a schematic diagram of a structure of a packet processing apparatus 1200 according to an embodiment of this application.

Correspondingly, an embodiment of this application further provides a packet processing apparatus 1200, as shown in FIG. 12. The packet processing apparatus 1200 is used in a network device. The network device may be the network device that is used as an execution body in the embodiment shown in FIG. 7. The apparatus 1200 may include: a first obtaining unit 1201, a first determining unit 1202, a second obtaining unit 1203, and a processing unit 1204. The first obtaining unit 1201 is configured to obtain a first packet, where the first packet includes first dynamic information of the first packet, and the first dynamic information represents a status or a requirement corresponding to an application. The first determining unit 1202 is configured to determine a first network resource based on the first dynamic information, where the network device forwards, by using the first network resource, a packet corresponding to the application. The second obtaining unit 1203 is configured to obtain a second network resource for forwarding a packet of the application, where the second network resource is determined based on a detection result of in-band flow measurement on packets of the application and second dynamic information, and the second dynamic information is dynamic information, of the application, used when the packet of the application is forwarded by using the first network resource. The processing unit 1204 is configured to process a second packet of the application based on the second network resource.

When the packet processing apparatus 1200 is configured to perform the method 100 shown in FIG. 7, the first obtaining unit 1201 is configured to perform S101 in the method 100 shown in FIG. 7. For implementation and same descriptions, refer to S101. The first determining unit 1202 is configured to perform S102 in the method 100 shown in FIG. 7. For implementation and same descriptions, refer to S102. The second obtaining unit 1203 is configured to perform S103 in the method 100 shown in FIG. 7. For implementation and same descriptions, refer to S103. The processing unit 1204 is configured to perform S104 in the method 100 shown in FIG. 7. For implementation and same descriptions, refer to S104.

The network resource includes but is not limited to one or more of the following: a quality of service class, a forwarding path, a bandwidth, a network slice, a radio channel, or a radio frequency.

A service requirement of the application is determined based on at least one of the following information: a threshold corresponding to the dynamic information of the application, application feature information, or application requirement information, where the application feature information represents an attribute of the application, the application requirement information represents a requirement of the application for a second network, and the second network is a network using a client of the application and a server of the application as boundaries. The second network includes a first network.

In-band flow measurement includes but is not limited to in-situ operations, administration, and maintenance iOAM or in-situ flow information telemetry iFIT.

The network device (or the packet processing apparatus 1200) may be, for example, a provider edge PE device of the first network, or may be another device connected to the PE device of the first network. The network device is directly or indirectly connected to the client of the application or the server of the application.

In an embodiment, the apparatus 1200 may further include a second determining unit. The second determining unit is configured to: before the first network resource is determined based on the first dynamic information, determine, based on the first dynamic information, that a third network resource for forwarding a packet of the application cannot meet the service requirement of the application, where a service requirement reached by the first network resource for forwarding the packet of the application is higher than a service requirement reached by the third network resource for forwarding the packet of the application, or the first network resource is a backup network resource of the third network resource.

In an example, the second determining unit is configured to determine that the first dynamic information does not meet the service requirement of the application.

In an embodiment, the second determining unit is configured to determine that the first dynamic information includes indication information, where the indication information indicates to perform enhancement or backup switchover on the third network resource used by the application. The first packet includes an application-aware Internet Protocol version 6 APN6 option header, and a sub-type length value TLV field of a service status option Service Status Option field in the APN6 option header carries the indication information. For example, a type Type field or a sub type Sub Type field of the sub-TLV carries the indication information, or an I flag included in the sub-TLV carries the indication information.

In an embodiment, the apparatus 1200 may further include a detection unit. The detection unit is configured to perform in-band flow measurement on the packets of the application, to obtain the detection result.

In an embodiment, the apparatus 1200 may further include a third obtaining unit. The third obtaining unit is configured to: after the first network resource is determined based on the first dynamic information and before the second network resource for forwarding the packet of the application is obtained, obtain a third packet, where the third packet includes the second dynamic information. The second obtaining unit is configured to determine the second network resource based on the detection result and the second dynamic information.

In an embodiment, the apparatus 1200 may further include a third obtaining unit and a first sending unit. The third obtaining unit is configured to: after the first network resource is determined based on the first dynamic information and before the second network resource for forwarding the packet of the application is obtained, obtain a third packet, where the third packet includes the second dynamic information. The first sending unit is configured to send the second dynamic information to a controller. The second obtaining unit is configured to: receive the second network resource sent by the controller, where the second network resource is determined by the controller based on the detection result and the second dynamic information.

In an embodiment, if the detection result and the second dynamic information meet a preset first condition, the first network resource is the same as the second network resource.

In an example, the preset first condition includes: The detection result meets the service requirement of the application, and the dynamic information of the application indicates that a status of the application is improved or the requirement of the application is met.

In an embodiment, the preset first condition includes: The detection result does not meet the service requirement of the application. The apparatus 1200 may further include a second sending unit. The second sending unit is configured to send alarm information to a network management device, where the alarm information indicates that the first network does not have a capability of providing the service requirement of the application for the application, the first network is a network using the network device as a boundary, the network using the client of the application and the server of the application as the boundaries is denoted as the second network, and the second network includes the first network.

In an embodiment, if the detection result and the second dynamic information meet a preset second condition, a service requirement reached by the second network resource for forwarding the packet of the application is lower than the service requirement reached by the first network resource for forwarding the packet of the application, or the second network resource is a backup network resource of the first network resource.

In an example, the preset second condition includes: The detection result meets the service requirement of the application, but the dynamic information of the application indicates that a status of the application is not improved or the requirement of the application is not met.

It should be noted that the packet processing apparatus 1200 corresponds to the foregoing method 100. For an implementation and an effect achieved, refer to related descriptions of the method 100.

Figure 13:
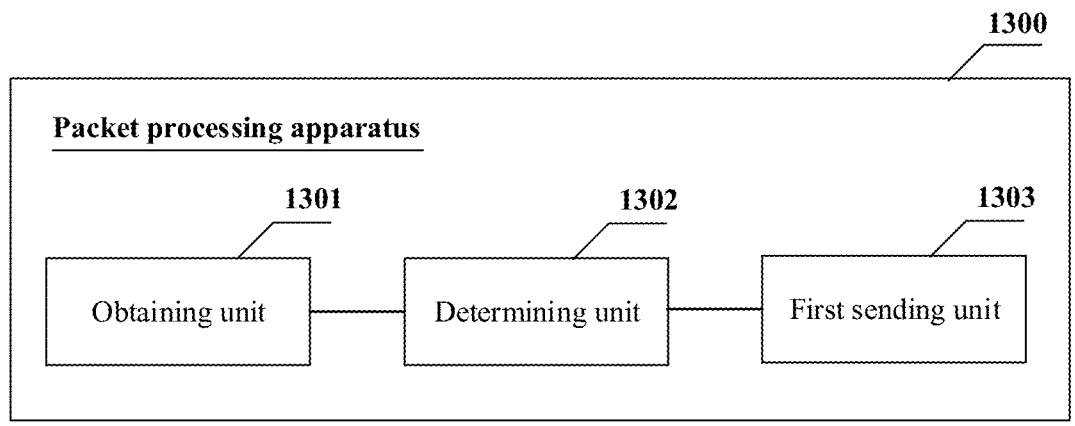
FIG. 13 is a schematic diagram of a structure of a packet processing apparatus 1300 according to an embodiment of this application.

Correspondingly, an embodiment of this application further provides a packet processing apparatus 1300, as shown in FIG. 13. The packet processing apparatus 1300 is used in a controller. The controller may be the controller that is used as an execution body in the embodiment shown in FIG. 11. The apparatus 1300 may include an obtaining unit 1301, a determining unit 1302, and a first sending unit 1303. The obtaining unit 1301 is configured to obtain a detection result of in-band flow measurement on packets of an application in a first network resource and second dynamic information, where the second dynamic information is dynamic information, of the application, used when a packet of the application is forwarded by using the first network resource, the first network resource is determined by a first network device based on first dynamic information in a received first packet, the first network device forwards, by using the first network resource, the packet corresponding to the application, and the first dynamic information represents a status or a requirement corresponding to the application. The determining unit 1302 is configured to determine, based on the detection result and the second dynamic information, a second network resource for forwarding a packet of the application. The first sending unit 1302 is configured to send the second network resource to the first network device, to indicate the first network device to process a second packet of the application based on the second network resource.

When the packet processing apparatus 1300 is configured to perform the method 200 shown in FIG. 11, the obtaining unit 1301 is configured to perform S201 in the method 200 shown in FIG. 11. For implementation and same descriptions, refer to S201. The first determining unit 1302 is configured to perform S202 in the method 200 shown in FIG. 11. For implementation and same descriptions, refer to S202. The first sending unit 1303 is configured to perform S203 in the method 200 shown in FIG. 11. For implementation and same descriptions, refer to S203.

The network resource includes but is not limited to one or more of the following: a quality of service class, a forwarding path, a bandwidth, a network slice, a radio channel, or a radio frequency.

A service requirement of the application is determined based on at least one of the following information: a threshold corresponding to the dynamic information of the application, application feature information, or application requirement information, where the application feature information represents an attribute of the application, the application requirement information represents a requirement of the application for a second network, and the second network is a network using a client of the application and a server of the application as boundaries. The second network includes a first network.

In-band flow measurement includes but is not limited to in-situ operations, administration, and maintenance iOAM or in-situ flow information telemetry iFIT.

The first network device may be, for example, a provider edge PE device of the first network, and the first network device is connected to the client of the application or the server of the application.

In an embodiment, the obtaining unit 1301 may include a receiving subunit and a determining subunit. The receiving subunit is configured to receive detection information of in-band flow measurement on the packets of the application in the first network in the first network resource, where the first network is a network using the first network device as a boundary, the network using the client of the application and the server of the application as the boundaries is denoted as the second network, and the second network includes the first network. The determining subunit is configured to determine the detection result based on the received detection information.

In an embodiment, the obtaining unit 1301 is configured to receive the detection result sent by a second network device.

In an embodiment, if the detection result and the second dynamic information meet a preset first condition, the first network resource is the same as the second network resource.

In an example, the preset first condition includes: The detection result meets the service requirement of the application, and the dynamic information of the application indicates that a status of the application is improved or the requirement of the application is met.

In an embodiment, the preset first condition includes: The detection result does not meet the service requirement of the application. The apparatus 1300 may further include a second sending unit. The second sending unit is configured to send a third network resource to the first network device, where the third network resource enables the first network to have a capability of providing the service requirement of the application for the application, the first network is a network using the first network device as a boundary, the network using the client of the application and the server of the application as the boundaries is denoted as the second network, and the second network includes the first network.

In an embodiment, if the detection result and the second dynamic information meet a preset second condition, a service requirement reached by the second network resource for forwarding the packet of the application is lower than a service requirement reached by the first network resource for forwarding the packet of the application, or the second network resource is a backup network resource of the first network resource.

In an example, the preset second condition includes: The detection result meets the service requirement of the application, but the dynamic information of the application indicates that a status of the application is not improved or the requirement of the application is not met.

It should be noted that the packet processing apparatus 1300 corresponds to the foregoing method 200. For an implementation and an effect achieved, refer to related descriptions of the method 200.

Figure 14:
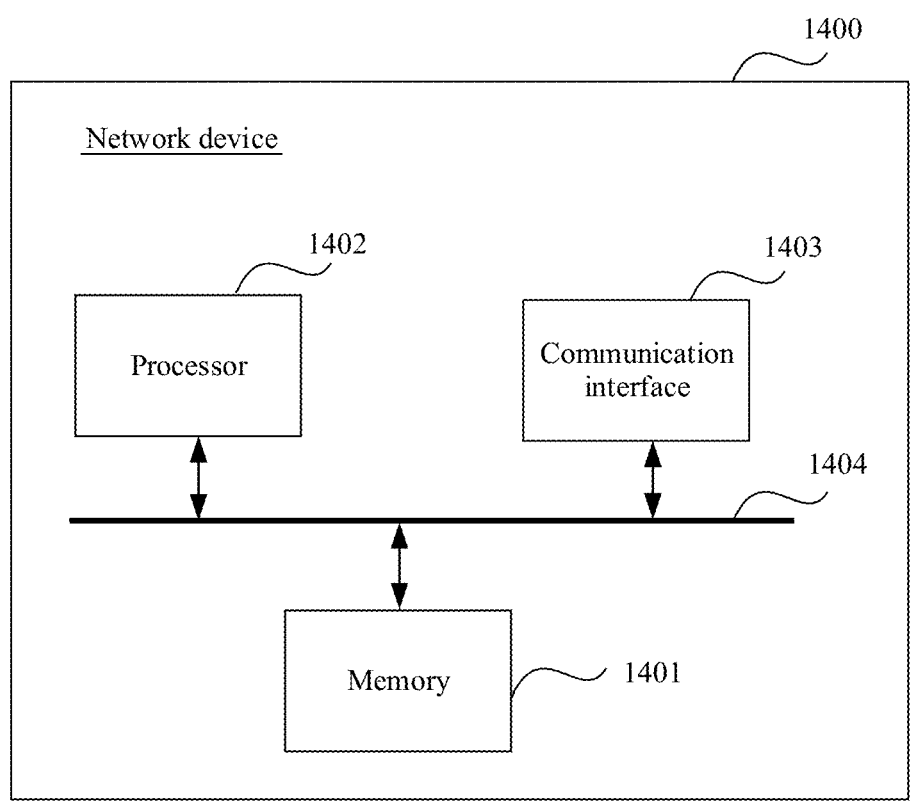
FIG. 14 is a schematic diagram of a structure of a network device 1400 according to an embodiment of this application.

In addition, refer to FIG. 14. An embodiment of this application further provides a network device 1400. The network device 1400 may implement a function of the network device 31 in the embodiment shown in FIG. 6, or may implement a function of the network device used as an execution body in the embodiment shown in FIG. 7. The network device 1400 includes a memory 1401, a processor 1402, and a communication interface 1403.

The memory 1401 is configured to store a computer program or instructions.

The processor 1402 is configured to invoke the computer program or the instructions stored in the memory, so that the network device performs the method implemented by the network device in the embodiment shown in FIG. 7.

The communication interface 1403 is configured to communicate with another device in a network.

The memory 1401, the processor 1402, and the communication interface 1403 are connected to each other through a bus 1404. The bus 1404 may be a peripheral component interconnect (PCI) bus, an extended industry standard architecture (EISA) bus, or the like. Buses may be classified into an address bus, a data bus, a control bus, and the like. For ease of representation, only one thick line is used to represent the bus in FIG. 14, but this does not mean that there is only one bus or only one type of bus.

In an embodiment, the processor 1401 is configured to: determine a first network resource based on first dynamic information, where the network device forwards, by using the first network resource, a packet corresponding to an application; further configured to: obtain a second network resource for forwarding a packet of the application, where the second network resource is determined based on a detection result of in-band flow measurement on packets of the application and second dynamic information, and the second dynamic information is dynamic information, of the application, used when the packet of the application is forwarded by using the first network resource; and further configured to: process a second packet of the application based on the second network resource. For a detailed processing process of the processor 1401, refer to S102 to S104 in the embodiment shown in FIG. 7. Details are not described herein again.

The communication interface 1403 is configured to receive a packet of the application, for example, receive the first packet and the second packet. For a process, refer to S101 in the embodiment shown in FIG. 7. Details are not described herein again.

Figure 15:
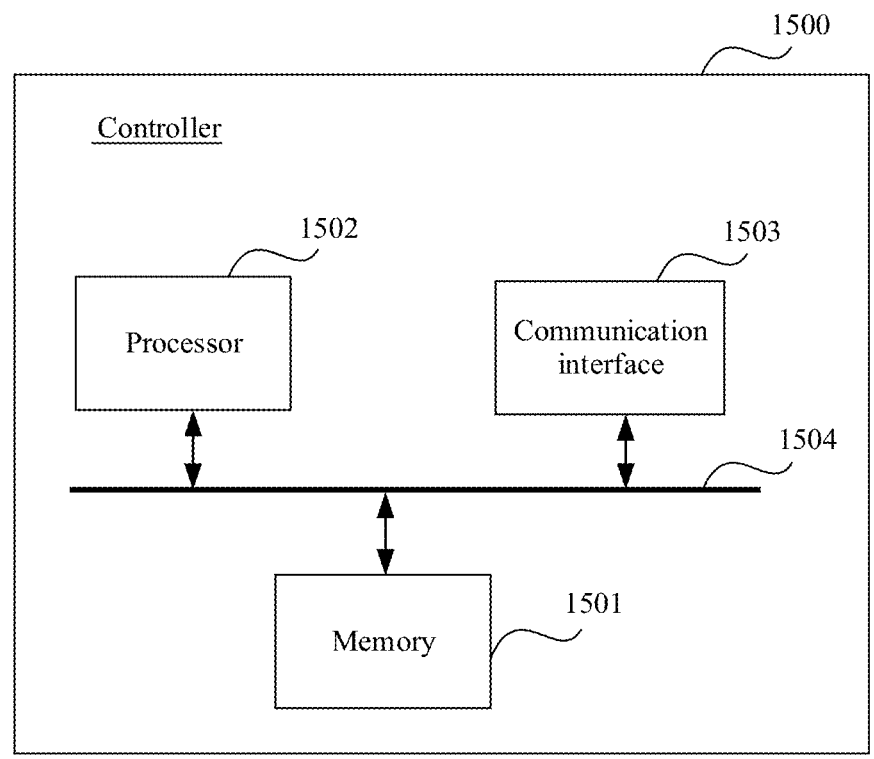
FIG. 15 is a schematic diagram of a structure of a controller 1500 according to an embodiment of this application.

Refer to FIG. 15. An embodiment of this application further provides a controller 1500. The controller 1500 may implement a function of the controller 50 in the embodiment shown in FIG. 6, or may implement a function of the controller used as an execution body in the embodiment shown in FIG. 11. The controller 1500 includes a memory 1501, a processor 1502, and a communication interface 1503.

The memory 1501 is configured to store a computer program or instructions.

The processor 1502 is configured to invoke the computer program or the instructions stored in the memory, so that the controller performs the method implemented by the controller in the embodiment shown in FIG. 11.

The communication interface 1503 is configured to communicate with another device in a network.

The memory 1501, the processor 1502, and the communication interface 1503 are connected to each other through a bus 1504. The bus 1504 may be a PCI bus, an EISA bus, or the like. Buses may be classified into an address bus, a data bus, a control bus, and the like. For ease of representation, only one thick line is used to represent the bus in FIG. 15, but this does not mean that there is only one bus or only one type of bus.

In an embodiment, the processor 1501 is configured to determine, based on a detection result and second dynamic information, a second network resource for forwarding a packet of an application. For a detailed processing process of the processor 1501, refer to S202 in the embodiment shown in FIG. 11. Details are not described herein again.

The communication interface 1503 is configured to obtain the detection result of in-band flow measurement on packets of the application in a first network resource and the second dynamic information, and is further configured to send the second network resource to a first network device. For a process, refer to S201 and S203 in the embodiment shown in FIG. 11. Details are not described herein again.

The foregoing memory 1401 and memory 1501 may be a random access memory (RAM), a flash memory, a read-only memory (ROM), an erasable programmable read-only memory (EPROM), an electrically erasable programmable read-only memory (EEPROM), a register, a hard disk, a removable hard disk, a CD-ROM, or any other form of storage medium known to persons skilled in the art.

The processor 1402 and the processor 1502 may be, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communication interface 1403 and the communication interface 1503 may be, for example, an interface card, and may be an Ethernet interface or an asynchronous transfer mode (ATM) interface.

An embodiment of this application further provides a communication system 1600.

Figure 16:
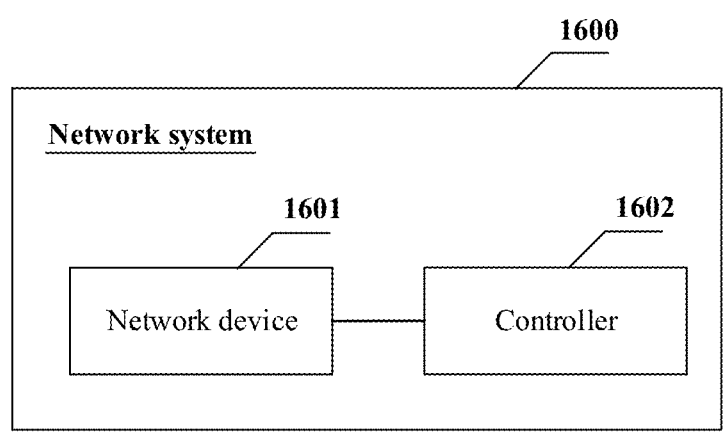
FIG. 16 is a schematic diagram of a structure of a network system 1600 according to an embodiment of this application.

Refer to FIG. 16. The communication system 1600 includes a network device 1601 and a controller 1602. The network device 1601 may be the foregoing packet processing apparatus 1200, and the controller 1602 is the foregoing packet processing apparatus 1300. Alternatively, the network device 1601 may be the network device 1400, and the controller 1602 is the controller 1500.

An embodiment of this application provides a computer-readable storage medium, including instructions. When the instructions are run on a computer, the computer is enabled to perform the foregoing service processing method.

An embodiment of this application further provides a chip. The chip is disposed in a packet processing apparatus 1200 or a network device 1400, and the chip includes a processor and an interface circuit. The interface circuit is configured to receive code instructions and transmit the code instructions to the processor. The processor is configured to run the code instructions to perform the packet processing method that is implemented by the network device and that is applied to the embodiment shown in FIG. 7.

An embodiment of this application further provides a chip. The chip is disposed in a packet processing apparatus 1300 or a controller 1500, and the chip includes a processor and an interface circuit. The interface circuit is configured to receive code instructions and transmit the code instructions to the processor. The processor is configured to run the code instructions to perform the packet processing method that is implemented by the controller and that is applied to the embodiment shown in FIG. 11.

In this application, "at least one item (piece)" means one or more, and "a plurality of" means two or more. The term "at least one of the following (items)" or a similar term refers to any combination of those items, including any combination of singular item or plural items. For example, at least one item (piece) of a, b, or c may represent: a, b, c, a and b, a and c, b and c, or a, b, and c, where a, b, and c may be singular or plural. In this application, it is considered that "A and/or B" includes only A, only B, and both A and B.

In the specification, claims, and accompanying drawings of this application, the terms "first", "second", "third", "fourth", and so on (if existent) are intended to distinguish between similar objects but do not necessarily indicate an order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

It may be clearly understood by persons skilled in the art that, for the purpose of convenient and brief description, for a detailed working process of the foregoing system, apparatuses, and units, refer to a corresponding process in the foregoing method embodiments, and details are not described herein again.

In the several embodiments provided in this application, it should be understood that the disclosed system, apparatuses, and methods may be implemented in other manners. For example, the described apparatus embodiments are merely examples. For example, unit division is merely logical module division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for instructing a computer device (which may be a personal computer, a server, or a network device) to perform all or some of the operations of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and beneficial effects of this application are further described in detail in the foregoing specific implementations. It should be understood that the foregoing descriptions are merely implementations of this application.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A packet processing method, comprising:
   obtaining, by a network device, a first packet comprising first dynamic information of the first packet, and the first dynamic information represents a status or a requirement corresponding to an application, wherein the first dynamic information comprises indication information, and the indication information is carried in a sub-type length value (TLV) field of a service status option Service Status Option field in an application-aware internet protocol version 6 networking (APN6) option header, and wherein a type Type field or a sub type Sub Type field of the sub-TLV carries the indication information, or an I flag comprised in the sub-TLV carries the indication information;
   determining, by the network device, a first network resource based on the first dynamic information, and forwarding, by the network device by using the first network resource, a packet corresponding to the application;
   obtaining, by the network device, a second network resource for forwarding a packet of the application, wherein the second network resource is determined based on a detection result of in-band flow measurement on packets of the application and second dynamic information which is dynamic information, of the application, used when the packet of the application is forwarded by using the first network resource; and
   processing, by the network device, a second packet of the application based on the second network resource.

2. The method according to claim 1, wherein before the determining the first network resource based on the first dynamic information, the method further comprises:
   determining, by the network device based on the first dynamic information, that a third network resource for forwarding a packet of the application cannot meet a service requirement of the application, wherein a service requirement reached by the first network resource for forwarding the packet of the application is higher than a service requirement reached by the third network resource for forwarding the packet of the application, or the first network resource is a backup network resource of the third network resource.

3. The method according to claim 2, wherein the determining that the third network resource for forwarding the packet of the application cannot meet the service requirement of the application comprises:
   determining, by the network device, that the first dynamic information does not meet the service requirement of the application.

4. The method according to claim 2, wherein the determining that the third network resource for forwarding the packet of the application cannot meet the service requirement of the application comprises:
   determining, by the network device, that the first dynamic information comprises indication information indicating to perform enhancement or backup switchover on the third network resource used by the application.

5. The method according to claim 4, wherein the first packet comprises the APN6 option header, and wherein the APN6 option header carries the indication information.

6. The method according to claim 1, further comprising:
   performing, by the network device, in-band flow measurement on the packets of the application, to obtain the detection result.

7. The method according to claim 1, wherein after the determining the first network resource based on the first dynamic information, and before the obtaining the second network resource for forwarding the packet of the application, the method further comprises:
   obtaining, by the network device, a third packet comprising the second dynamic information; and
   the obtaining the second network resource for forwarding the packet of the application comprises:
   determining, by the network device, the second network resource based on the detection result and the second dynamic information.

8. The method according to claim 1, wherein after the determining the first network resource based on the first dynamic information, and before the obtaining the second network resource for forwarding the packet of the application, the method further comprises:
   obtaining, by the network device, a third packet comprising the second dynamic information; and
   sending, by the network device, the second dynamic information to a controller; and
   the obtaining the second network resource for forwarding the packet of the application comprises:
   receiving, by the network device, the second network resource sent by the controller, wherein the second network resource is determined by the controller based on the detection result and the second dynamic information.

9. The method according to claim 1, wherein if the detection result and the second dynamic information meet a preset first condition, the first network resource is the same as the second network resource.

10. The method according to claim 9, wherein the preset first condition comprises: the detection result meets the service requirement of the application, and the dynamic information of the application indicates that a status of the application is improved or the requirement of the application is met.

11. The method according to claim 9, wherein the preset first condition comprises: the detection result does not meet the service requirement of the application, and the method further comprises:
sending, by the network device, alarm information to a network management device, wherein the alarm information indicates that a first network does not have a capability of providing the service requirement of the application for the application, the first network is a network using the network device as a boundary, a network using a client of the application and a server of the application as boundaries is denoted as a second network comprising the first network.

12. The method according to claim 1, wherein if the detection result and the second dynamic information meet a preset second condition, a service requirement reached by the second network resource for forwarding the packet of the application is lower than the service requirement reached by the first network resource for forwarding the packet of the application, or the second network resource is a backup network resource of the first network resource.

13. The method according to claim 12, wherein the preset second condition comprises: the detection result meets the service requirement of the application, but the dynamic information of the application indicates that a status of the application is not improved or the requirement of the application is not met.

14. A packet processing apparatus used in a network device, comprising: at least one processor and one or more memories, wherein
the one or more memories are configured to store instructions or program code; and
the at least processor is configured to execute the instructions or the program code in the one or more memories, to enable the network device to:
obtain a first packet comprising first dynamic information of the first packet, and the first dynamic information represents a status or a requirement corresponding to an application, wherein the first dynamic information comprises indication information, and the indication information is carried in a sub-type length value (TLV) field of a service status option Service Status Option field in an application-aware internet protocol version 6 networking (APN6) option header, and wherein a type Type field or a sub type Sub Type field of the sub-TLV carries the indication information, or an I flag comprised in the sub-TLV carries the indication information;
determine a first network resource based on the first dynamic information, wherein the network device forwards, by using the first network resource, a packet corresponding to the application;
obtain a second network resource for forwarding a packet of the application, wherein the second network resource is determined based on a detection result of in-band flow measurement on packets of the application and second dynamic information which is dynamic information, of the application, used when the packet of the application is forwarded by using the first network resource; and
process a second packet of the application based on the second network resource.

15. The packet processing apparatus according to claim 14, wherein the at least processor is configured to execute the instructions or the program code in the one or more memories, to enable the network device to:
determine, based on the first dynamic information, that a third network resource for forwarding a packet of the application cannot meet a service requirement of the application, wherein a service requirement reached by the first network resource for forwarding the packet of the application is higher than a service requirement reached by the third network resource for forwarding the packet of the application, or the first network resource is a backup network resource of the third network resource.

16. The packet processing apparatus according to claim 15, wherein the at least processor is configured to execute the instructions or the program code in the one or more memories, to enable the network device to:
determine, that the first dynamic information does not meet the service requirement of the application.

17. The packet processing apparatus according to claim 15, wherein the at least processor is configured to execute the instructions or the program code in the one or more memories, to enable the network device to:
determine that the first dynamic information comprises indication information indicating to perform enhancement or backup switchover on the third network resource used by the application.

18. The packet processing apparatus according to claim 17, wherein the first packet comprises the APN6 option header, and wherein the APN6 option header carries the indication information.

19. The packet processing apparatus according to claim 14, wherein the at least processor is configured to execute the instructions or the program code in the one or more memories, to enable the network device to:
perform in-band flow measurement on the packets of the application, to obtain the detection result.

\* \* \* \* \*